United States Patent
Wong et al.

(10) Patent No.: US 10,356,673 B2
(45) Date of Patent: *Jul. 16, 2019

(54) METHOD AND SYSTEM FOR MANAGING WIRELESS CONNECTIVITY IN A COMMUNICATION SYSTEM

(71) Applicants: AT&T INTELLECTUAL PROPERTY I, L.P., Atlanta, GA (US); AT&T Mobility II LLC, Atlanta, GA (US); Interwise, Ltd., Airport (IL)

(72) Inventors: Tony Wong, Dallas, TX (US); Zahi Kapeluto, Raanana (IL); Thomas Keathley, Dallas, TX (US)

(73) Assignees: AT&T Intellectual Propert I, L.P., Atlanta, GA (US); AT&T Mobility II LLC, Atlanta, GA (US); Interwise, Ltd., Airport City (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,467

(22) Filed: Apr. 27, 2018

(65) Prior Publication Data

US 2018/0249385 A1    Aug. 30, 2018

Related U.S. Application Data

(63) Continuation of application No. 15/669,564, filed on Aug. 4, 2017, now Pat. No. 9,986,475, which is a
(Continued)

(51) Int. Cl.
*H04L 12/26* (2006.01)
*H04W 36/00* (2009.01)
(Continued)

(52) U.S. Cl.
CPC ...... *H04W 36/0083* (2013.01); *H04B 17/318* (2015.01); *H04L 43/0876* (2013.01);
(Continued)

(58) Field of Classification Search
CPC ............ H04W 36/0083; H04W 36/30; H04W 36/0055; H04W 36/0058; H04L 43/0876; H04B 17/318
See application file for complete search history.

(56) References Cited

U.S. PATENT DOCUMENTS

| 7,245,915 B2 | 7/2007 | Matta et al. |
| 7,403,778 B2 | 7/2008 | Reynolds |

(Continued)

FOREIGN PATENT DOCUMENTS

| CA | 2786702 A1 | 7/2011 |
| DE | 10322205 A1 | 3/2004 |

(Continued)

OTHER PUBLICATIONS

PCT/US2016/030516 International Preliminary Report on Patentability, dated Nov. 16, 2017, 12 pages.
(Continued)

*Primary Examiner* — Brandon J Miller
(74) *Attorney, Agent, or Firm* — Guntin & Gust, PLC; Ralph Trementozzi

(57) ABSTRACT

Aspects of the subject disclosure may include, for example, a method, including applying a voice quality model to network performance information associated with a voice over internet protocol call session to generate a measure of voice quality associated with a first wireless radio access network wirelessly coupling a mobile device and a communication network, detecting a trigger condition for a measurement reporting according to the measure of voice quality, a first signal of the first wireless radio access network, and a second signal of a second wireless radio access network, and detecting a trigger condition for a measurement report according to the measure of voice quality, a first signal of the first network, and a second signal of a network. The measurement report can be transmitted to the first
(Continued)

wireless radio access network responsive to detecting the trigger condition for the measurement reporting. Other embodiments are disclosed.

20 Claims, 14 Drawing Sheets

Related U.S. Application Data continuation of application No. 14/702,932, filed on May 4, 2015, now Pat. No. 9,763,148.

(51) Int. Cl.
*H04W 36/30* (2009.01)
*H04B 17/318* (2015.01)

(52) U.S. Cl.
CPC ... *H04W 36/0055* (2013.01); *H04W 36/0058* (2018.08); *H04W 36/30* (2013.01)

(56) References Cited

U.S. PATENT DOCUMENTS

| | | | |
|---|---|---|---|
| 7,953,042 B2 | 5/2011 | Kwak et al. | |
| 7,986,665 B2 | 7/2011 | Kezys et al. | |
| 8,199,720 B2 | 6/2012 | Hahn et al. | |
| 8,417,244 B2 | 4/2013 | Alonso-Rubio et al. | |
| 8,493,937 B2 | 7/2013 | Nix | |
| 8,553,526 B2 | 10/2013 | Meylan et al. | |
| 8,787,172 B2 | 7/2014 | Klingenbrunn et al. | |
| 8,787,316 B2 | 7/2014 | Zhao et al. | |
| 8,792,448 B2 | 7/2014 | Nix | |
| 8,855,641 B2 | 10/2014 | Kumar Reddy et al. | |
| 8,868,067 B2 | 10/2014 | Chou et al. | |
| 9,484,702 B2* | 11/2016 | Payeur | H01S 3/0057 |
| 9,763,148 B2* | 9/2017 | Wong | H04B 17/318 |
| 9,986,475 B2* | 5/2018 | Wong | H04B 17/318 |
| 2003/0218995 A1* | 11/2003 | Kim | H04W 36/0066 370/318 |
| 2004/0229616 A1* | 11/2004 | Dutta | H04B 7/18541 455/436 |
| 2006/0217112 A1 | 9/2006 | Mo | |
| 2007/0156804 A1 | 7/2007 | Mo | |
| 2007/0201403 A1 | 8/2007 | Thome et al. | |
| 2008/0026752 A1 | 1/2008 | Flore et al. | |
| 2008/0070576 A1 | 3/2008 | Sanders et al. | |
| 2011/0002308 A1 | 1/2011 | Nagasawa et al. | |
| 2011/0122812 A1 | 5/2011 | Jeong et al. | |
| 2011/0188472 A1* | 8/2011 | Jeon | H04W 36/0083 370/331 |
| 2011/0299399 A1 | 12/2011 | Egan et al. | |
| 2012/0088507 A1 | 4/2012 | Legg et al. | |
| 2013/0044620 A1 | 2/2013 | Sul et al. | |
| 2013/0053043 A1 | 2/2013 | Wei et al. | |
| 2013/0079005 A1* | 3/2013 | Watanabe | H04W 36/0083 455/435.1 |
| 2013/0237225 A1 | 9/2013 | Martin et al. | |
| 2014/0078898 A1 | 3/2014 | Anchan et al. | |
| 2014/0254399 A1 | 9/2014 | Yang et al. | |
| 2015/0024753 A1* | 1/2015 | Palenius | H04W 36/0061 455/436 |
| 2015/0110081 A1 | 4/2015 | White et al. | |
| 2015/0117406 A1 | 4/2015 | Kim et al. | |
| 2015/0207827 A1 | 7/2015 | Jheng | |
| 2016/0014666 A1 | 1/2016 | Mäller et al. | |
| 2016/0088527 A1* | 3/2016 | Wolff | H04W 36/0055 455/436 |
| 2016/0330660 A1 | 11/2016 | Wong | |
| 2017/0339610 A1 | 11/2017 | Wong et al. | |

FOREIGN PATENT DOCUMENTS

| | | |
|---|---|---|
| EP | 1367846 A1 | 12/2003 |
| EP | 2879306 A1 | 6/2015 |
| JP | 2008103865 A | 5/2008 |
| KR | 20090076755 | 7/2009 |
| KR | 20100113853 | 10/2010 |
| KR | 20110035529 | 4/2011 |
| KR | 101141426 B1 | 5/2012 |
| WO | 2013079556 A1 | 6/2013 |
| WO | 2014017872 A1 | 1/2014 |
| WO | 2015002404 | 1/2015 |
| WO | 2016179144 | 11/2016 |

OTHER PUBLICATIONS

"International Search Report & Written Opinion", PCT/US2016/030516, dated Jun. 28, 2016.

Balachandran, Athula, "Large Scale Data Analytics of User Behavior for Improving Content Delivery." Diss. US Army, 2014.

Toseef, Umar, LTE Optimization and Resource Management in Wireless Heterogeneous Networks. Diss. Faculty of Physics and Electrical Engineering, University of Bremen, 2013.

Wehbi, Bachar et al., "Document Title: Network monitoring in EPC." (2011). http://www. mevico. org/D51. pdf.

Wehbi, Bachar et al., "Network monitoring challenges in the evolved packet core." Future Network & Mobile Summit (FutureNetw), 2012. IEEE, 2012.

\* cited by examiner

Measurement Report Events

| Freq. | Event | Condition | 3GPP Rel. # |
|---|---|---|---|
| Intra-LTE (Intra- or Inter-Frequency) | A1 | Serving becomes better than absolute threshold | 8 |
| | A2 | Serving becomes worse than absolute threshold | 8 |
| | A3 | Neighbor cell becomes some offset better than the primary cell | 8 |
| | A3* (or new A7) | Neighbor cell becomes some offset better than the primary cell AND the MOS of primary cell is worse than a threhold | Propose for 13 or beyond |
| | A4 | Neighbor cell becomes better than a defined threshold | 8 |
| | A5 | Primary cell becomes worse than a defined threshold and a neighbor becomes better than a second threshold | 8 |
| | A6 | Neighbor cell becomes some offset better than the serving cell | 10 |
| IRAT (Inter-Radio Access Technology) | B1 | Inter-RAT neighbor becomes better a defined threshold | 8 |
| | B2 | Primary cell becomes worse than a defined threshold and inter-RAT neighbor becomes better than a second threshold | 8 |
| | B3 | Primary cell becomes worse than a defined threshold OR primary cell MOS becomes worse than a defined threshold and IRAT neighbor becomes better than a second threshold | Propose for 13 or beyond |

METHOD AND SYSTEM FOR MANAGING WIRELESS CONNECTIVITY IN A COMMUNICATION SYSTEM

CROSS-REFERENCE TO RELATED APPLICATIONS

This application is a Continuation of U.S. patent application Ser. No. 15/669,564, filed Aug. 4, 2017, which is a Continuation of U.S. patent application Ser. No. 14/702,932 (now U.S. Pat. No. 9,763,148), filed May 4, 2015. The contents of each of the foregoing is/are hereby incorporated by reference into this application as if set forth herein in full.

FIELD OF THE DISCLOSURE

The subject disclosure relates to a method and system for managing wireless connectivity in a communication system.

BACKGROUND

Communication systems, such as a mobile communications system, can be used for providing various services, including voice, video and/or data services, and user location information can be important for next generation IP multimedia services provided by telecommunication systems As the number of users and their service requirements increase, the load on the network increases. Infrastructure expansion and improvement can lessen the network load but are costly.

BRIEF DESCRIPTION OF THE DRAWINGS

Reference will now be made to the accompanying drawings, which are not necessarily drawn to scale, and wherein:

FIG. 3 depicts an illustrative embodiment of a set of measurement reporting events for a mobile device operating in the mobile communication system of FIG. 1;

DETAILED DESCRIPTION

Figure 1:
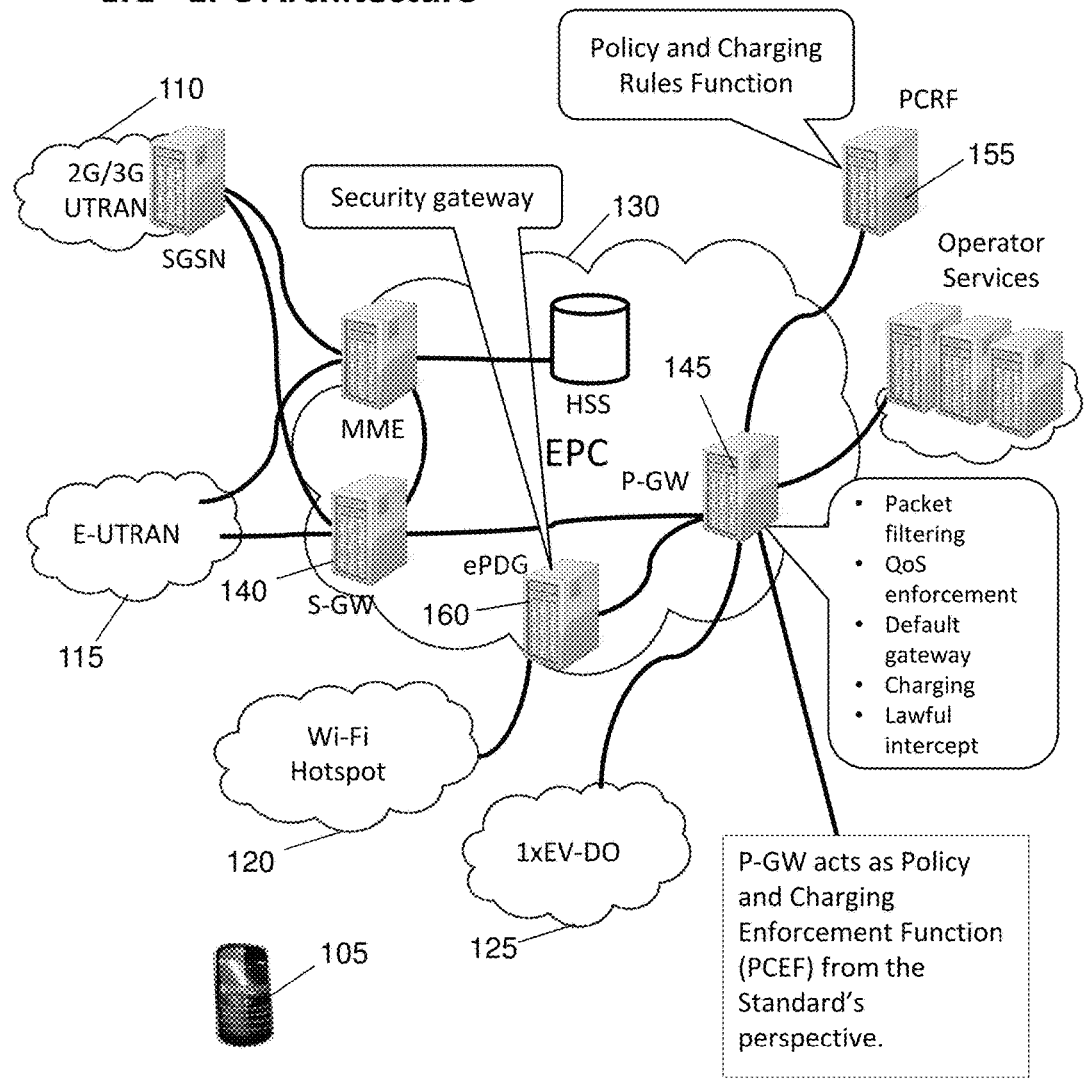
FIG. 1 depicts an illustrative embodiment of a mobile communication system for providing voice and data services to mobile devices.

The subject disclosure describes, among other things, illustrative embodiments for managing handover triggers for mobile devices operating in mobile communication networks, where voice quality, prior ranking, and signal strength of competing radio access networks are used in handover determination. Other embodiments are described in the subject disclosure.

One or more aspects of the subject disclosure include capturing network performance information at a mobile device. The network performance information can include characteristics that impact vocal quality for voice over internet protocol (VoIP) communications at the mobile device. For example, the mobile device can track latency, packet loss, jitter, and traffic loading associated with a VoIP call session. The mobile device can apply a voice quality model to this network performance information. For example, the mobile device can include a model for calculating a measure of voice quality, such as a predictive mean opinion score (MOS), for estimating a perceived customer quality of a VoIP call session from the available network performance information. Different Voice Coder-Decoder (Vocoder) algorithms may arrive at different MOS values, for example, due to similar impairments. The mobile device can measure the power and/or quality of a first signal emanating from a serving radio access network (RAN) device that is currently providing a wireless communication coupling between the mobile device and a communication network. The mobile device can also measure power/quality of a second signal emanating from a second, target RAN device that could be substituted for the serving RAN device. The mobile device can report these metrics, including the measured power/quality of the sensing and target RAN devices and the measure of voice quality. The serving RAN device can, in turn, analyze the measurement report data to determine if the combination of signal strength/power, the voice quality, and the relative priorities of the serving and target RAN devices are consistent with a handover trigger condition for the mobile device. That is, the combination of signal strength, RAN device priority, and voice quality make it desirable for the mobile device to be handed over from the serving RAN device to the target RAN device.

One embodiment of the subject disclosure includes a method including capturing, by a mobile device comprising a processor, network performance information that is associated with a voice over internet protocol call session, wherein a first wireless radio access network provides a first wireless communicative coupling of the mobile device and a communication network during the voice over internet protocol call session. The method can further include applying, by the mobile device, a voice quality model to the network performance information to generate a measure of voice quality for the mobile device. The method can also include measuring, by the mobile device, a first strength of a first signal that is received from the first wireless radio access network and a second strength of a second signal that is received from a second wireless radio access network and, in turn, detecting, by the mobile device, a trigger condition for a measurement reporting according to the measure of voice quality, the first strength of the first signal, and the second strength of the second signal. The method can include transmitting, by the mobile device, the measurement report comprising the measure of voice quality, the first strength of the first signal, and the second strength of the second signal responsive to the detecting of the trigger condition for the measurement reporting. The first wireless radio access network determines a handover trigger condition by applying a first handover policy to the measure of voice quality, the first strength of the first signal, and the second strength of the second signal of the measurement report. The first wireless radio access network can transmit a handover request to the second wireless radio access network responsive to the handover trigger condition. The second wireless radio access network can initiate a second wireless communicative coupling of the mobile device and the communication network to complete handover of the voice over internet protocol call session responsive to the handover request.

One embodiment of the subject disclosure includes device, including a first wireless radio access network, a processor, and a memory that stores executable instructions that, when executed by the processor, facilitate performance of operations, including initiating a first wireless communicative coupling of a mobile device and a communication network via the first wireless access network during a voice over internet protocol call session of the mobile device. The operations also include receiving a measurement report from the mobile device comprising a measure of voice quality for the voice over internet protocol call session. The measure of voice quality can be generated by applying the voice quality model to network performance information that is associated with the voice over internet protocol call session operating over the first wireless radio access network. The operations can further include determining a handover trigger condition for the mobile device by applying a first handover policy to the measurement report and, in turn, transmitting a handover request to a second wireless radio access network responsive to the determining of the handover trigger condition. The second wireless radio access network can initiate a second wireless communicative coupling of the mobile device and the communication network to complete handover of the voice over internet protocol call session responsive to the handover request.

One embodiment of the subject disclosure includes machine-readable storage medium, including executable instructions that, when executed by a processor, facilitate performance of operations, including applying a voice quality model to network performance information associated with a voice over internet protocol call session to generate a measure of voice quality associated with a first wireless radio access network wirelessly coupling a mobile device and a communication network. The operations can also include detecting a trigger condition for a measurement reporting according to the measure of voice quality, a first signal of the first wireless radio access network, and a second signal of a second wireless radio access network. The operations can further include transmitting the measurement report to the first wireless radio access network responsive to detecting the trigger condition for the measurement reporting, wherein the first wireless radio access network transmits a handover request to the second wireless radio access network based on applying a first handover policy to the measure of voice quality, the first signal, and the second signal of the measurement report. The second wireless radio access network can initiate a second wireless coupling of the mobile device and the communication network to complete a handover of the voice over internet protocol call session to the second wireless radio access network responsive to the handover request from the first wireless radio access network.

FIG. 1 depicts an illustrative embodiment of a mobile communication system for providing voice and data services to mobile devices. The mobile communication system, or communication system 100, can include an evolved packet core (EPC) 130 with components for managing mobile device or user equipment 105 access to network resources. The EPC 130 can include two primary gateways, a Serving Gateway (S-GW) 140 and the PDN Gateway (P-GW) 145. The S-GW can face the external packet data networks, such as the evolved-universal terrestrial radio access network (E-UTRAN) 115 and the universal terrestrial radio access network (UTRAN) 110. A user equipment (UE) or mobile device 105 can be connected to at most one S-GW 140 at any time, with connected being made via a communicative coupling to the S-GW 140 (and, therefore, the EPC 130) that is made by a particular radio access network (RAN) device 110 or 115. However, the mobile device 105 may be connected to the EPC 130 using multiple P-GW devices 145, one P-GW device 145 for every packet data network that the mobile device 105 is interacting with. The mobile device 105 does not interface directly to the P-GW. Rather, the mobile device 105 is communicatively coupled to the P-GW 145 (and, therefore, the EPC 130) via either the external packet network RAN devices or the S-GW 140, such as UTRAN 110 and E-UTRAN 115, or by data connections, such as a Wi-Fi hotspot 120 or an evolution-data optimized wireless router (1×EV-DO) 125. Note that the S-GW 140 and the P-GW 145 may coexist on the same physical platform.

The S-GW may be responsible for anchoring the user plane for inter-evolved Node B (eNodeB) handover and inter-3GPP mobility, similar to the role of a GGSN in a pre-LTE architecture. Functionally, an S-GW 140 can resemble a server GPRS support node (SGSN) from a second generation or third generation (2G/3G) network but without the mobility and session functionality, and with minimal involvement in data bearer management. The S-GW 140 can support lawful interception operations, routing data packets between the P-GW 145 and the E-UTRAN 115, and buffering downlink data during paging operations.

The P-GW 145 can act as a default router to the UE or mobile device 105 and can be responsible for anchoring the user plane for mobility between 3GPP access systems and non-3GPP access systems. The P-GW 145 can functions much like a Mobile IP (MIP) Home Agent (HA), and can provide support for charging, lawful interception and policy enforcement. The P-GW 145 can also perform DiffServ Code Point (DSCP) marking for QoS management.

The EPC 130 can also include a Policy and Charging Rules Function (PCRF) 155. To support Quality of Service (QoS) in the LTE-EPC network, the PCRF 155 logical node can connect to the P-GW 145, which may implement the Policy and Charging Enforcement Function (PCEF). The EPC 130 can further include an Evolved Packet Data Gateway (ePDG) 160. The ePDG can provide interworking with untrusted non-3GPP IP access systems, such as a Wi-Fi Hotspot gateway 120, and can provide additional security mechanisms.

In one or more embodiments, the communication system 100 can provide a method and system for managing handover of the mobile device 105 between radio access network (RAN) devices over same technology and differing technology. For example, handovers are managed for LTE and intra-LTA or Inter-Radio Access Technology (IRAT). Generally, the mobile device performs cell selection/reselection when the mobile device 105 is in an idle state, and the communication system 100 performs handover between RAN devices 110-125 when the mobile device 105 is in an active state.

In one or more embodiments, a mobile device 105 is communicating the communication network 100, the entry point of the connectivity path for is a wireless communication node 110-125. For example, the mobile device 105 can be communicatively coupled to the EPC network 130 via the E-UTRAN (also, eNodeB) 115, which is the Evolved Universal Terrestrial Access Network that is used in LTE. Alternatively, the mobile device 105 can be connected to the EPC network 130 via the UTRAN (Universal Terrestrial Access Network, also NodeB) 110 used in 2G and 3G networks. In another example, the mobile device 105 can be connected via a Wi-Fi Hotspot 120 that interfaces the mobile device 105 to the network via Wi-Fi capabilities. In yet another example, the mobile device 105 can be connected via an Evolution-Data Optimized (EV-DO) channel that provides high speed data (only, not voice) and can function as a personal hot spot to a 3G system.

In one or more embodiments, a mobile device 105 can detect an availability of more than one wireless communication channel to access the network. Each of these Radio Access Technology (RAT) networks 110-125 can provide a potential connection path, but each path can have a different signal strength, data capability, speed, bandwidth, priority, voice quality (due to the combination of all the characteristics its signal path). Ideally, the mobile device 105 can always switch to the "best" Radio Access Network (RAN) device, but the best RAN device can be determined by what is best for both the customer's device and/or the communication network 100 as a whole. The mobile device 105 and/or the communication network 100 can determine if or when to switch the mobile device 105 from one RAN device 110 to another RAN device 115.

In one or more embodiments, the mobile device 105 can capture network performance information. The network performance information can include characteristics that impact vocal quality for voice over internet protocol (VoIP) communications at the mobile device 105. For example, the mobile device 105 can be coupled to the communication network 100 via the E-UTRAN 115. During a VoIP call session, the mobile device 105 can track latency, packet loss, jitter, and traffic loading associated with the VoIP call session.

In one or more embodiments, the mobile device 105 can apply a voice quality model to the collected network performance information. For example, a model for calculating a measure of voice quality, such as a predictive mean opinion score (MOS), can be included at the mobile device 105 for estimating a perceived customer quality of a VoIP call session from the available network performance information. The mobile device 105 can apply the model to the network performance information to calculate a predicted voice quality for the VoIP call session. If the measure of the voice quality is the MOS, then a MOS score can be calculated for the mobile device 105 using, for example, the standard MOS scoring scale of 1 to 5.

In one or more embodiments, the Mean Opinion Score has been used to determine customer opinions about call quality on traditional, plain old telephone (POT) systems. It has been found that MOS scores on a packet-switched, LTE system are going to be largely determined by a combination of good signal strength plus low levels of latency, packet loss, and jitter, good data through put rates, and low levels of backhaul congestion and traffic loading. The network performance components, other than RF strength, are found to dominate voice quality, especially for voice signal paths that lack the one-to-one matching of the eNodeB path, such as VoIP. When the mobile device 105 uses the Wi-Fi Hotspot 120 or the EV-DO 125, or even the UMTS paths, the best choice of RAN device, from an MOS perspective, may not be based on the RF signal strength of the RAN device. The MOS is a single number score, from 1 (worst) to 5 (best) of customer perceived call quality. Traditionally, this has been measured with surveys/studies where customers give feedback on call quality. Now, with voice over IP (VoIP) calls, it has been found that various system/network performance characteristics (jitter, packet loss, latency) can be closely correlated with customer survey-based MOS scores. Thus, an MOS (or other measure of voice quality) model can be derived that can predict a voice quality score based on network performance information.

In one or more embodiments, the mobile device 105 can measure the power and/or quality of signals emanating from one or more RAN devices 110-125. For example, the mobile device 105 may be being served by the E-UTRAN RAN device 115 such that a first signal emanating from the E-UTRAN may be currently providing a wireless communication coupling between the mobile device 105 and the communication network 100. The mobile device 105 can measure the power/quality of the first signal from the serving E-UTRAN RAN device 115. In addition, the mobile device 105 can measure the power/quality of a second signal emanating from a second, target RAN device, such as the Wi-Fi Hotspot RAN device 120 that could be substituted for the serving RAN device 115.

In one or more embodiments, the mobile device 105 can follow a measurement reporting policy to determine if the mobile device 105 should report information to, for example, the E-UTRAN RAN device 115 or the Wi-Fi Hotspot RAN device 120. The measurement reporting policy can, for example, use the measured power/quality of the serving RAN device 115 signal and the measured power/quality of the target RAN device 120 along with the calculated measure of voice quality for the serving RAN device 115 to determine if these metrics should be sent to the serving RAN device 115 as a measurement report. In one or more embodiments, a handover policy can be used by the serving RAN device 115 to identify if a combination of signal strength/power, the voice quality, and relative priorities of the serving RAN device 115 and the target RAN device 120 are consistent with a handover trigger condition for the mobile device 105. That is, the combination of signal strength, RAN device priority, and voice quality can make it desirable for the mobile device 105 to be handed over from the serving RAN device 115 to the target RAN device 120. In one or more embodiments, the serving RAN device 115 (the serving eNB) can apply the handover policy to the signal power/strengths and the measured voice quality to determine if the mobile device 105 should be handed over. If the serving RAN device 115 determines that a handover is in order, then the serving RAN device 115 can send a request to the target RAN device 120 indicating the handover trigger condition and requesting a handover, where the serving RAN device 115 and the target RAN device 120 can coordinate the handover.

In one or more embodiments, the power/quality of the RAN device signals can be measured and/or evaluated by the mobile device 105. In one embodiment, the signal can be evaluated according to a Reference Signal Received Power (RSRP), a Received Signal Strength Indicator (RSSI), and/or a Reference Signal Received Quality (RSRQ). RSRP is a RSSI-type of measurement. RSRP measures an average received power over the resource elements that carry cell-specific reference signals within certain frequency bandwidth. RSRQ is a connected or idle type of measurement that indicates the quality of the received reference signal. RSRQ is defined as (N*RSRP)/(E-UTRA Carrier RSSI), where N makes sure the nominator and denominator are measured over the same frequency bandwidth;

The carrier RSSI measures an average total received power observed only in OFDM symbols containing reference symbols for antenna port 0 (i.e., OFDM symbol 0 & 4 in a slot) in the measurement bandwidth over N resource blocks. The total received power of the carrier RSSI includes the power from co-channel serving & non-serving cells, adjacent channel interference, thermal noise, etc.

The RSRQ measurement provides additional information when RSRP is not sufficient to make a reliable handover or cell reselection decision. In one or more embodiments, the handover policy allows for flexibility, where RSRP, RSRQ, or a combination of both can be used. RSRP can be used to measure the RAN device signal whether the mobile device 105 is in a radio resource control (RRC) idle mode or an RRC connected mode. However, RSRQ can only be used to measure the RAN device signal when the mobile device 105 is in the RRC connected mode. In the procedure of cell selection and cell reselection in idle mode, RSRP is used.

In one or more embodiments, hysteresis can be used. The thresholds for the RAN device signal strength/quality can be used in a handover policy for making handover decisions. However, is the same thresholds are used for handovers in both directions (i.e., switching from the serving RAN device and, later, back to the (prior) serving RAN device), then the mobile device could "ping-pong" between RAN devices if signal conditions were to cause the RAN device signal measurement to hover at or near the single signal threshold. To overcome ping-ponging, hysteresis can be added by using multiple switching thresholds that are selected by the handover policy according to the state of transition.

In one or more embodiments, the handover policy can include a measure of voice quality of the serving RAN device and priorities of the serving and target RAN devices. The resulting handover policy can allow the mobile device 105 to determine whether or not to handover while insuring that the resulting RAN device (whether the serving or target) will provide sufficient voice quality while including a bias to RAN device technologies, such as Wi-Fi Hotspots, that can offload burdens from the EPC network 130 while providing advantages to the user of the mobile device 105. Older approaches lean heavily on wireless signal strength as perceived at the mobile device. However, wireless signal strength is not always a good proxy for best overall service, network performance, etc., and, especially, not for best voice quality for VoIP calls. A strong RAN device signal could be fronting a weak signal path for call processing. What we want is a method/system for handovers between available RAN device choices that facilitates choosing the best option for call processing.

In one example, a mobile device 105 that is engaged in an active VoIP call being served by E-UTRAN RAN device 115 (eNodeB) can enter a shopping center. As the mobile device 105 enters the shopping center, the radio frequency (RF) signal strength of the serving RAN device can be diminished due to in-building penetration loss. However, the shopping center may offer a free Wi-Fi hotspot 120. In one or more embodiments, it can be advantageous if the active voice call could be handed over from the E-UTRAN (eNodeB) RAN device 115 to the building Wi-Fi hotspot 120. This handover could conserve network resources (E-UTRAN capacity) while possibly saving tolls for the mobile device 105. Generally, the handover policy can make an easier path for transitioning from the E-UTRAN (eNodeB) RAN device 115 to the Wi-Fi hotspot RAN device 120 because the Wi-Fi hotspot RAN device 120 is a higher priority RAN device than the E-UTRAN RAN device 115.

In another example, the mobile device 105 can be moving from an area served by a first E-UTRAN (eNodeB) RAN device 115 to an area served by a second E-UTRAN (eNodeB) RAN device, while the smart phone is engaged in a voice call or is operating in RRC-Connected mode. The measured signal strength (as detected at the mobile device 105) for the serving RAN device 115 can be decreasing, while the measured signal strength for the target RAN device 115 is increasing at the mobile device 105. In this case, it may be useful to handover from the server RAN device to the target RAN device. Since both RAN devices have the same priority, the decision to handover can be made by the serving eNB based on both the relative power difference between the RAN devices and, further, based on the measured voice quality of the server RAN device. If the mobile device 105 is in the RRC-Idle mode, then a decision for cell reselection can made by the mobile device 105. If the voice quality is holding up (in spite of the movement of the mobile device 105), then the best course could be to maintain the server RAN device connection rather than risking a transition to the target RAN device, where the voice quality may not prove out.

In another example, the mobile device 105 can be leaving a building after connecting to the Wi-Fi hotspot RAN device 120 of the building and while the mobile device 105 is engaged in a VoIP call session (RRC-Connected mode). Here, the Wi-Fi hotspot RAN device 120 has a higher priority than, for example, the E-UTRAN RAN device 115. Based on the higher priority of the Wi-Fi hotspot RAN device 120, the handover policy can delay the transition from the Wi-Fi hotspot RAN device 120 to the E-UTRAN RAN device 115 so that the call session is maintained on the Wi-Fi hotspot RAN device 120 as long as possible—even when the signal strength of the E-UTRAN RAN device 115 is higher than the signal strength of the Wi-Fi hotspot RAN device 120.

In one or more embodiments, the handover policy can consider whether the mobile device 105 is in active mode or RRC-connected mode when determining whether to send a report to the serving RAN device requesting a handover to a target RAN device. When a mobile device 105 is in Radio Resource Control (RRC) Connected Mode (RRC-Connected) mode, also considered Active mode, then the mobile device 105 will actively/periodically report the conditions of its data channel to its serving RAN device at every 20 milliseconds, or so. In RRC-Connected mode, the mobile device 105 can continue reporting its RAN device channel condition on an on-going basis. If, however, there is no user data being exchanged between the mobile device 105 and the communication network 100, then the mobile device 105 will exit the RRC-Connected state and enter an RRC-Idle state. For example, an inactivity timer of about 4 seconds can cause the transition from the RRC-Connected state to the RRC-Idle state.

In one or more embodiments, when the mobile device 105 is in the RRC-Idle state, then the mobile device 105 can listen for broadcast messages from its serving RAN device, such as the E-UTRAN (eNodeB) 115. The broadcast message can be, for example, a System Information Block (SIB) message that provides static system parameters and threshold settings. The mobile device 105 can use the reception of the Reference Signals as an opportunity to measure the RF power/quality level for the signal coming from its serving RAN device. The mobile device 105 can also measure the RF power/quality level for a signal coming from another RAN device(s), such as the EV-DO RAN device 125, which is in range of the mobile device 105. In one or more embodiments, if the mobile device 105 is in the RRC-Idle mode, then the mobile device 105 can apply a cell reselection policy by comparing the measured signal power/quality levels to threshold values and to consider the priorities of the serving RAN device 115 and the target RAN device 120. The cell reselection policy can determine if the idle state mobile device 105 reselects from the serving RAN device 115 to the target RAN device 120. In one or more embodiments, the cell reselection policy can include the signal power/quality levels and the priority while not including a measure of voice quality, since user data is not transmitted for the mobile device 105 while it is in RRC-Idle state. In one example, if a tracking area ID (TAI) of the mobile device 105 may not change (i.e., the device has not substantially moved across cells with a different tracking area ID), then the mobile device 105 does not need to initiate any reporting about its signal strength measurements to its signal RAN device 115 unless the TAU timer expires.

Figure 2:
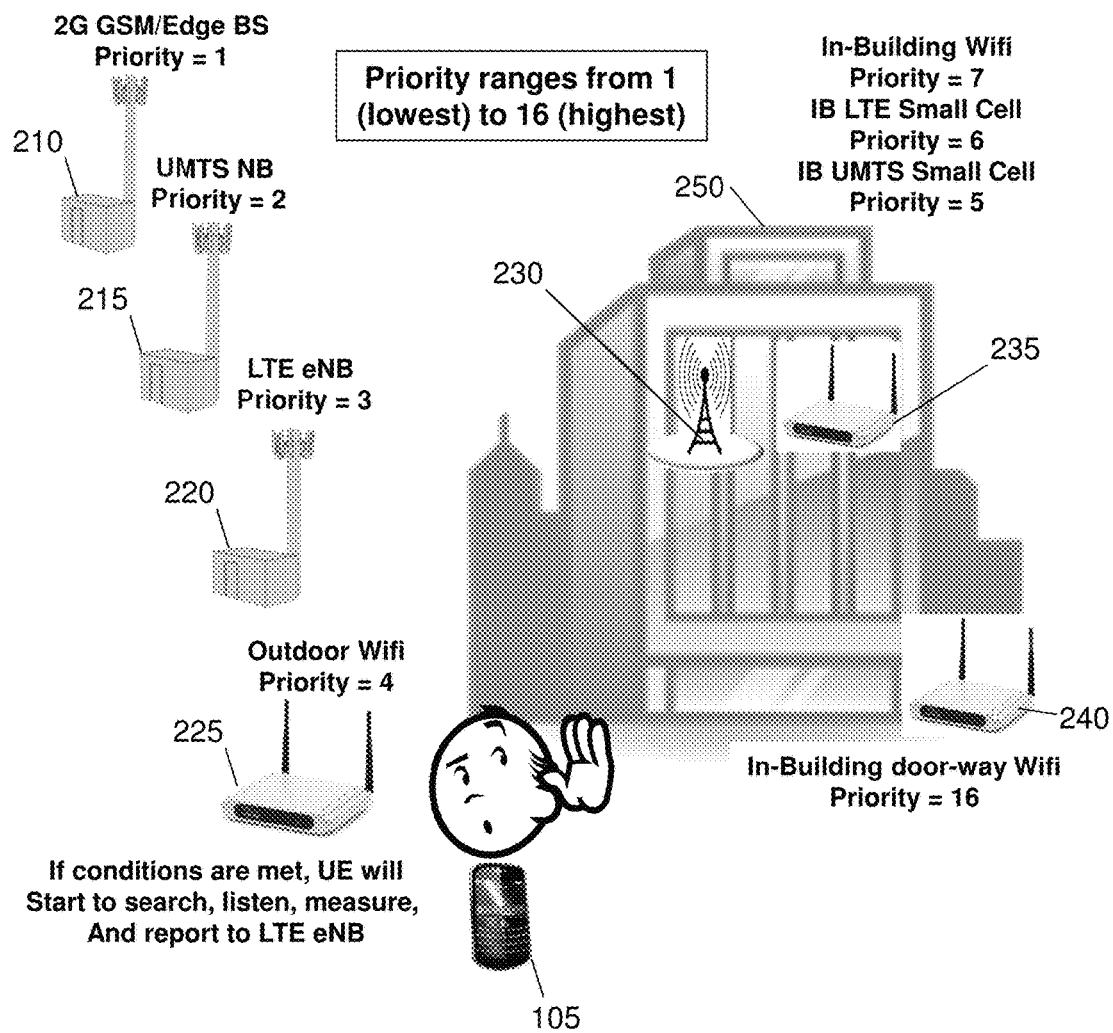
FIG. 2 depicts an illustrative embodiment of the use of priority for handovers to wireless connectivity access points in the mobile communication system of FIG. 1.

FIG. 2 depicts an illustrative embodiment of the use of priority for handovers to wireless connectivity access points in the mobile communication system of FIG. 1. In one or more embodiments, different RAN device 210-240 can have different priority rankings. In particular, the priority of each RAN device can be based on one or more factors, such as the type of wireless technology, whether the RAN device provides a data-hub/hotspot capability, and/or the age/version of the technology. In addition, the priority of the RAN device can be based on measured network data and, thereby, calculated voice quality scores, such as MOS scores. In one or more embodiments, the priorities of various RAN devices can be range between 1 and 16. Generally, the priority of a RAN device can increase as with advancing technology (e.g., 2G to LTE), with transition from cellular to data hot spots (e.g., cellular to Wi-Fi), and with improving voice quality (e.g., low MOS score to high MOS score). For example, in the vicinity of a building 250, a mobile device 105 may detect a number of RAN devices 210-240, with some of those RAN devices being within the building 250. Here, the lowest priority RAN device 210 is 2G GSM/Edge BS with an assigned priority of 1. A UMTS NB device 215 has a higher priority of 2 due to a more advanced technology, while an LTE eNodeB device 220 has a priority of 3 for the same reason. An outdoor Wi-Fi hotspot 225 can have a yet higher priority of 4 because it is a direct data router that allows the mobile device 105 to avoid toll charges and because it offloads the cellular system.

When the mobile device 105 enters the building 250, it can encounter a number of nearby RAN devices 230-240 while still detecting the outdoor RAN devices 210-225. Since the in-building RAN device connections 230-240 are provided expressly for off-loading the outdoor (general) RAN device connection 210-225 for the benefit of mobile devices 105 in use in the building, the priorities of the in-building RAN devices 230-240 can be higher (e.g., ranging from 7 to 16) than the priorities of the outdoor RAN devices 210-225 (e.g., ranging from 1 to 4). Again, the in-building RAN device connections 230-240 increase in priority with increasing cellular technology and with transition from cellular to data hotspot (e.g., Wi-Fi). In addition, priority can be used to cause particular locations within the building 250 to be emphasized or de-emphasized. For example, an in-building Wi-Fi hotspot 240 that is located at the door way of the building 250 can receive a high priority such that mobile device 105 that are entering the building 105 will be incentivized to deselect their serving RAN device and select the Wi-Fi hotspot 240.

FIG. 3 depicts an illustrative embodiment of a set of measurement reporting events for a mobile device operating in the mobile communication system of FIG. 1. In one or more embodiments, when the mobile device 105 is in RRC-Connected Mode, the mobile device 105 sends reports to its serving RAN device 115 (e.g. E-UTRAN eNodeB) to report the condition of its communication channel to the communication network 100. The sending of the measurement report is based on an event trigger. The triggering events are pre-defined to correspond to threshold levels for the RAN device signal power/quality and/or the measured voice quality (e.g. MOS score). In one or more embodiments, trigger events A7 and B3 incorporate both the signal power/quality of the serving (primary) and target neighbor(s) RAN devices and the MOS performance of the serving RAN device. In one or more embodiments, the following Intra-LTE events can be pre-defined to trigger measurement reports:

- Event A1: Serving cell signal power/quality becomes better than absolute threshold;
- Event A2: Serving cell signal power/quality becomes worse than absolute threshold;
- Event A3: Neighbor cell signal power/quality becomes better than the serving cell power/quality by an amount of offset;
- Event A4: Neighbor cell signal power/quality becomes better than absolute threshold;
- Event A5: Serving cell signal power/quality becomes worse than an absolute threshold1 AND neighbor cell signal power/quality becomes better than absolute threshold2;
- Event A6: Target cell signal power/quality becomes better than serving cell power/quality by an amount of offset; an
- Event A7: Neighbor cell signal power/quality becomes better than the serving cell power/quality by an offset AND the MOS of the serving cell is worse than a threshold.

In one or more embodiments, the following Inter-RAT events can be pre-defined to trigger measurement reports:

- Event B1: Inter-RAT neighbor cell signal power/quality becomes better than threshold;
- Event B2: Serving cell signal power/quality becomes worse than threshold1 and inter-RAT neighbor cell signal power/quality becomes better than threshold2; and
- Event B3: Serving cell signal power/quality becomes worse than threshold1 OR serving cell MOS becomes worse than threshold2 AND inter-RAT neighbor cell signal power/quality becomes better than threshold3.

Figure 4:
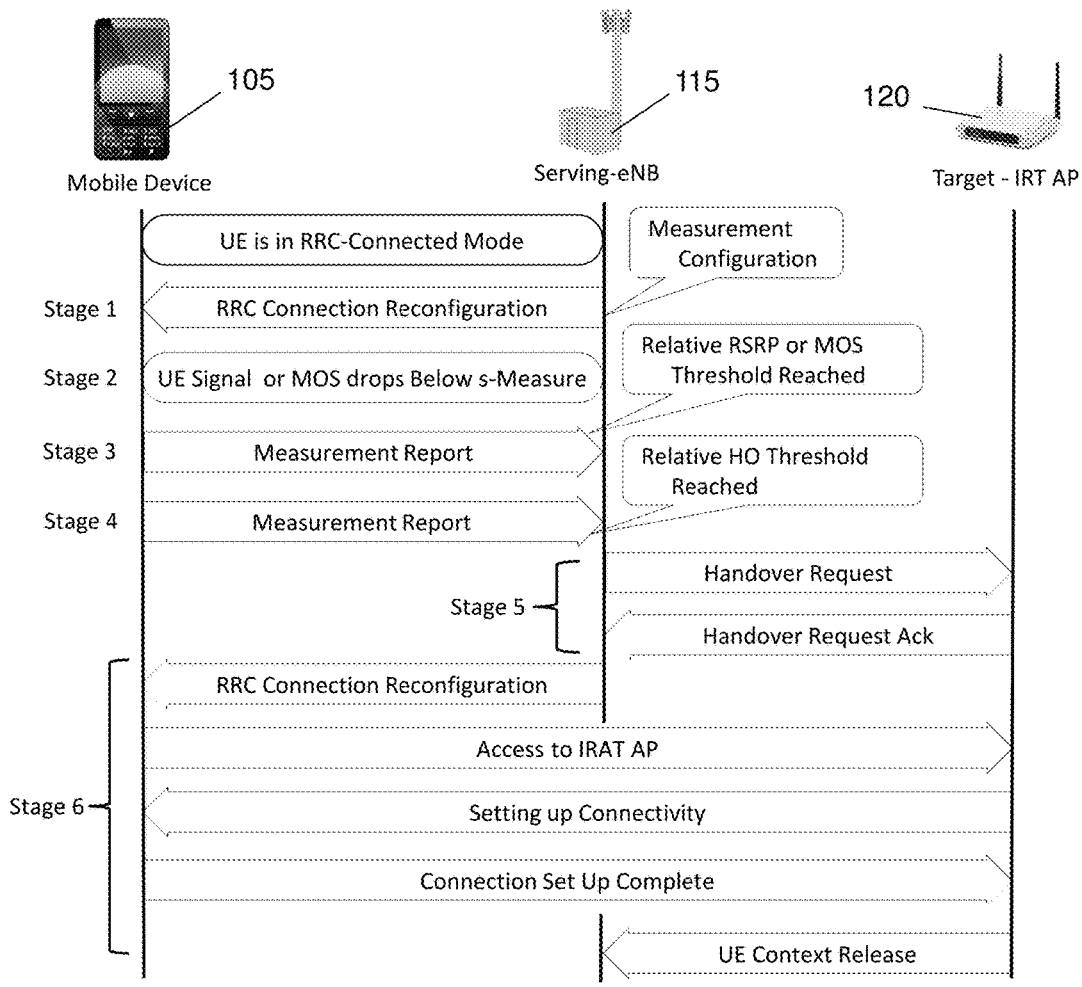
FIG. 4 depicts an illustrative embodiment of a handover call flow for a mobile device operating in the mobile communication system of FIG. 1.

FIG. 4 depicts an illustrative embodiment of a handover call flow for a mobile device operating in the mobile communication system of FIG. 1. In one or more embodiments, if the mobile device 105 is in RRC-Connected mode, the mobile device 105 issues measurement reports to the serving RAN device (such as E-UTRAN eNodeB) 115 whenever a reporting event trigger occurs. In one or more embodiments, the mobile device 105 can have one or more measurement report configuration policies. The measurement configuration applies a set of rules to the information available to the mobile device 105 for determining if the mobile device 105 should send a measurement report to the serving RAN device 115 (serving eNB). The mobile device 105 can receive one or more measurement report configurations from the communication network 100 to enable the mobile device to analyze RAN device and system performance in different operating conditions before determining a course of action with respect to measurement reporting. For example, the mobile device 105 can have a first measurement report configuration for when the mobile device 105 is operating in RRC-Connected mode whenever a certain set of conditions are met, and a second measurement report configuration when the mobile device 105 is operating in RRC-Connected mode and different set of conditions are met. In one or more embodiments, serving RAN devices 115 can have a first handover policy when the target RAN device 120 has a higher priority than the serving RAN device 115 and a second handover policy when the serving RAN device 115 has the higher priority.

Referring again to FIG. 4, in one example, a mobile device 105 is coupled to the communication network 100 by a serving RAN device (eNodeB) 115. The mobile device 105 moves from a vicinity of the serving eNodeB 115 to a vicinity of a target RAN device 120 that is a Wi-Fi hotspot, while the mobile device 105 is in the RRC-Connected state. When the mobile device 105 entered the RRC-Connected state, the serving eNodeB 115 will send a RRC Connection Reconfiguration message to the user equipment (UE) or mobile device 105, which will define the measurement configuration for the mobile device 105. At Stage 1, the serving RAN device eNodeB 115 sends the RRC Connection Reconfiguration message to the mobile device 105.

In one or more embodiments, the RRC Connection Reconfiguration message can define key measurement parameters for the mobile device 105 to use in event reporting. Some of the key measurement configuration parameters can be thresholds. For example, the RRC Connection Reconfiguration message can include S-Measure. S-Measure can be one or more threshold levels that can be used by the mobile device 105 when determining whether or not to send a report to the serving RAN device eNodeB 115. In one or more embodiments, the S-Measure can include thresholds for signal power/quality (RSRP) and/or for voice quality (e.g., MOS). As described above, the relationships between the RSRP and MOS S-Measure thresholds for the serving cell, a neighbor cell, and/or an IRAT neighbor cell can predefined in the measurement event triggers. The mobile device 105 can measure the signal power/quality (using RSRP) for the serving RAN device and for one or more target (neighbor) RAN devices (Intra-LTE and IRAT). If the any of the predefined events A1-A7 and B1-B3 occur, at Stage 2, then the mobile device 105 can send a measurement report to the serving RAN device eNodeB 115, as shown at Stage 3.

In one or more embodiments, if the measured levels (e.g., signal power, measure of voice quality, relative priorities of the serving and target RAN devices) further coincide with a handover event as defined by the handover policy, then the serving RAN device (eNodeB 115) can determine from the handover policy that a handover condition has been met for the mobile device 105 with respect to the performance of the serving RAN device 115 and the potential performance of the target RAN device 120, as shown at Stage 4.

In one or more embodiments, at Stage 3, if the serving RAN device 115 and the target (neighbor) RAN device 120 have X2 interfaces that are defined and enabled, then the serving RAN device 115 can send a Handover Request message to the target RAN device 120 across the X2 interface. The serving RAN device 115 can also send information about current bearers and related details to aid the target RAN device 120 in its admission control process. If the target RAN device 120 can support the mobile device 105 joining, then it can send a Handover Request Ack message to the serving RAN device 115. The Handover Request Ack message can include any resource allocations, such as a new C-RNTI for the mobile device 105 or PRACH resource information.

In one or more embodiments, at Stage 6, the serving RAN device 115 can capture the received information from target RAN device 120 and can use this information for sending an RRC Connection Reconfiguration message to the mobile device 105. In one embodiment, the mobile device 105 can couple to the target RAN device 120 and initiate a Physical Random Access Channel (PRACH) access procedure. On successful completion of the PRACH procedure and synchronizing timing, the mobile device 105 can send an RRC Connection Reconfiguration Complete message to the target RAN device 120. In one embodiment, the target RAN device 120 can send a context release message to the serving RAN device 115 to conclude the radio link part of handover for the mobile device 105. A data path switch can then be completed between the S-GW (if needed) and the (former) serving RAN device 115 and target RAN device 120 with the help of the MME of the EPC network 130.

Figure 5:
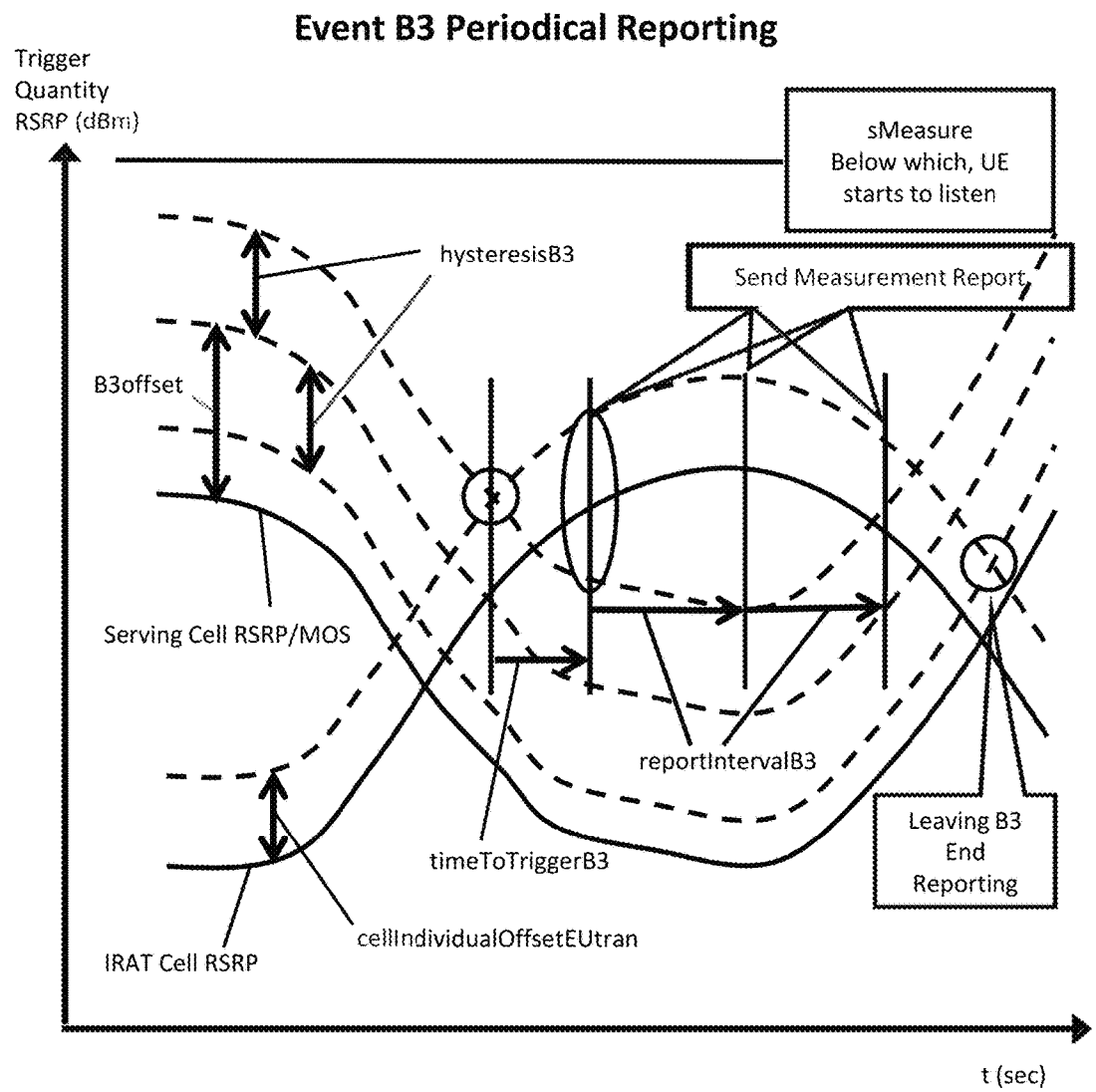
FIG. 5 depicts an illustrative embodiment of a B3-type event trigger for a mobile device to report measurement data in the mobile communication system of FIG. 1.

FIG. 5 depicts an illustrative embodiment of a B3-type event trigger for a mobile device to report measurement data in the mobile communication system of FIG. 1. In one or more embodiments, when a trigger event is detected, the mobile device 105 can send a measurement report. Events A7 and B3, as shown in FIG. 3, are defined to combine measured signal power data for the serving and target RAN device with voice quality data for the serving RAN device. Thus, events A7 and B3 are useful not only for triggering measurement reports but also for trigger a request for a handover of the mobile device 105 from the serving RAN device to the target RAN device. For example, the B3 event can be defined as "Serving cell signal power/quality becomes worse than threshold1 OR serving cell MOS becomes worse than threshold2 AND inter-RAT neighbor cell signal power/quality becomes better than threshold3." The B3 event, in effect, is triggered for either two potential weaknesses in the serving RAN device (low signal power or low voice quality) coupled with one potential strength in the serving RAN device (high signal power). This combination of potential weakness and strength can be useful for the mobile device 105 to report to the serving RAN device. Hence the occurrence of B3 can be used to trigger a measurement report. The combination can also be useful for triggering a handover at the serving RAN device for handing over the mobile device 105 to the target RAN device, if the relative priorities of the serving RAN device and target RAN device are also known.

In one or more embodiments, when the serving RAN device power or voice quality are below threshold while the target RAN device is above threshold, then the mobile device 105 is, technically, in a B3 event. The mobile device 105 can start a time-to-trigger timer. The time-to-trigger timer can be thought of as a digital filter that delays measurement report while the mobile device 105 verifies that the B3 trigger condition is extant for a time equal to the time-to-trigger timer. If the conditions change, such that the B3 trigger condition is no longer valid before the time-to-trigger timer expires, then the mobile device 105 can simply not report the "false" B3 event to the serving RAN device. However, if the B3 conditions continue to be valid until the time-to-trigger timer expires, then the mobile device 105 can send a Measurement Report message to the serving RAN device.

In one or more embodiments, the mobile device 105 can start a reportIntervalB3 timer when the Measurement Report message is sent. The reportIntervalB3 timer can be used to make the Measurement Report message a periodic update. If conditions remain valid and the reportIntervalA3 timer expires before the serving RAN device responds to the mobile device 105, the mobile device 105 can send a new Measurement Report message. This process can be repeated and/or can be limited to repeating a specified number of times (as governed by parameter reportAmount).

In one or more embodiments, the mobile device 105 can use different conditions for entering and exiting trigger events. For example, the threshold levels used for entering the B3 trigger event can be different from the threshold levels for exiting the B3 trigger event. By using different threshold levels, the mobile device 105 can create a level of hysteresis, whereby the mobile device 105 enters the B3 event trigger when the serving RAN device levels drop below threshold and the target RAN device levels rise above threshold, but the mobile device 105 remains in the B3 event even if the serving RAN device levels marginally recover or the target RAN device levels marginally diminish. This "margin" allows the mobile device 105 to avoid constant cycling between trigger and non-trigger states when the operating conditions are marginal. In one or more embodiments, the following exit condition can be required before the mobile device will trigger a B3 event:

Event B3: $Mn+Ofn+Ocn+Hys<Ms+Ofs+Ocs+Off,$ where Mn is the measurement result of the neighboring (target) cell, not taking into account any offsets, Ofn is the frequency specific offset of the frequency of the neighbor (target) cell, Ocn is the cell specific offset of the neighbor (target) cell, and set to zero if not configured for the neighbor (target) cell, Ms is the measurement result of the serving cell, not taking into account any offsets, Ofs is the frequency-specific offset of the serving frequency, Ocs is the cell-specific offset of the serving cell, and is set to zero if not configured for the serving cell, Hys is the hysteresis parameter for this event, and Off is the offset parameter for this event. The Mn and Ms measurements can be expressed in dBm (if RSRP is used) or in dB (if RSRQ is used). Ofn, Ocn, Ofs, Ocs, Hys and Off can be expressed in dB.

Figure 6:
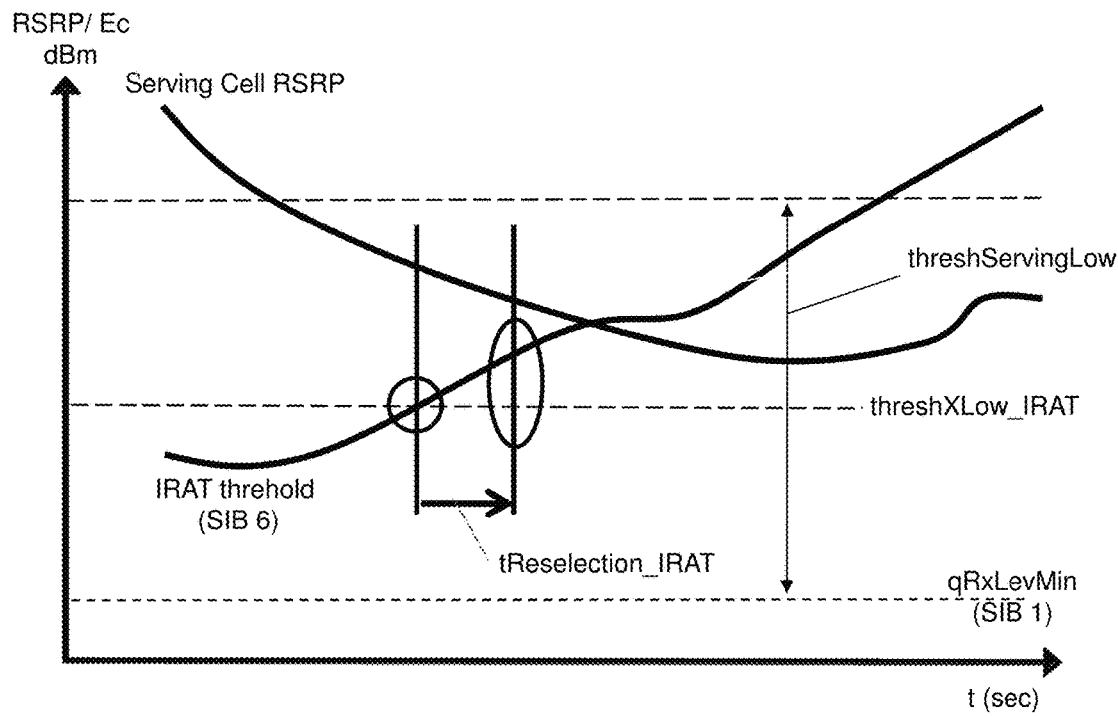
FIGS. 6-7 depict illustrative embodiments of a reselection of a radio access network for a mobile device operating in idle mode in the communication system of FIG. 1.
Figure 7:
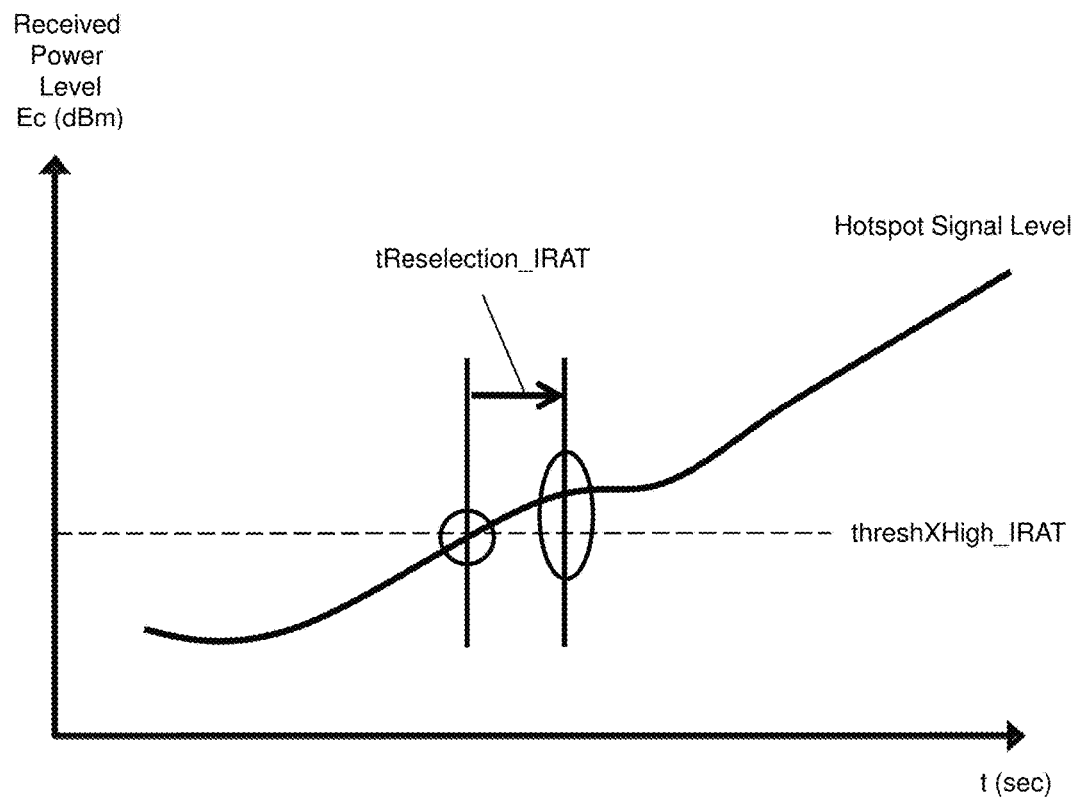

FIGS. 6-7 depict illustrative embodiments of a reselection of a radio access network for a mobile device operating in idle mode in the communication system of FIG. 1. In one or more embodiments, the mobile device 105 handles handover differently depending on whether the mobile device 105 is in RRC-Idle mode or RRC-Connected mode. If the mobile device is in RRC-Idle mode, then the mobile device 105 can monitor the power levels of the serving RAN device and the target RAN device, but the mobile device 105 is not receiving VoIP data and, therefore, cannot calculate predicted voice quality based on network performance information. Therefore, during RRC-Idle, the cell reselection policy for the mobile device 105 can be limited to considering the power/quality of the serving RAN device and the target RAN device and the relative priorities of the serving RAN device and the target RAN device. Further, since the mobile device 105 is not engaged in call sessions during the RRC-Idle mode, any transition of the mobile device 105 from the serving RAN device to the target RAN device can be described as a "reselection" of a RAN device by the mobile device 105 rather than a handover.

Referring to FIG. 6, one or more embodiments are illustrated. In this case, the serving RAN device has a higher priority that the target RAN device. In one embodiment, the /reselection policy can preclude reselection from a higher priority RAN device to a lower priority RAN device except where there are no intra-frequency target RAN device (eNodeB) and no higher priority IRAT options. Assuming that there are no higher priority options, the mobile device 105 is not allowed to reselect unless the power/quality level of the serving RAN device drops below a threshold while the power/quality level of the target RAN device is above a threshold. As a further limitation, the power/quality levels for the serving LAN and target LAN must be established for a reselection time ($t_{Reselection}$). In the illustration, the serving LAN RSRP drops below its threshold (thresholdServing1Low), then the IRAT RSRP rises above its threshold (threshXLow_IRAT), which initiates the reselection time ($t_{Reselection}$). At the expiration of the reselection time, the mobile device 105 can initiate a reselection from the serving RAN device to the target RAN device. For example, the LTE network is newer technology when compared to UMTS, and, therefore, a serving RAN device that is an E-UTRAN will have higher priority than a target RAN device that is a UTRAN. The reselection policy for the serving RAN device having higher priority can be defined as follows:

If the power of the serving cell is less than its power threshold
AND
If the power of the target cell is greater than its power threshold
FOR
At least a threshold time,
THEN
The reselection can begin for the RRC-Idle device.

Figure 8A:
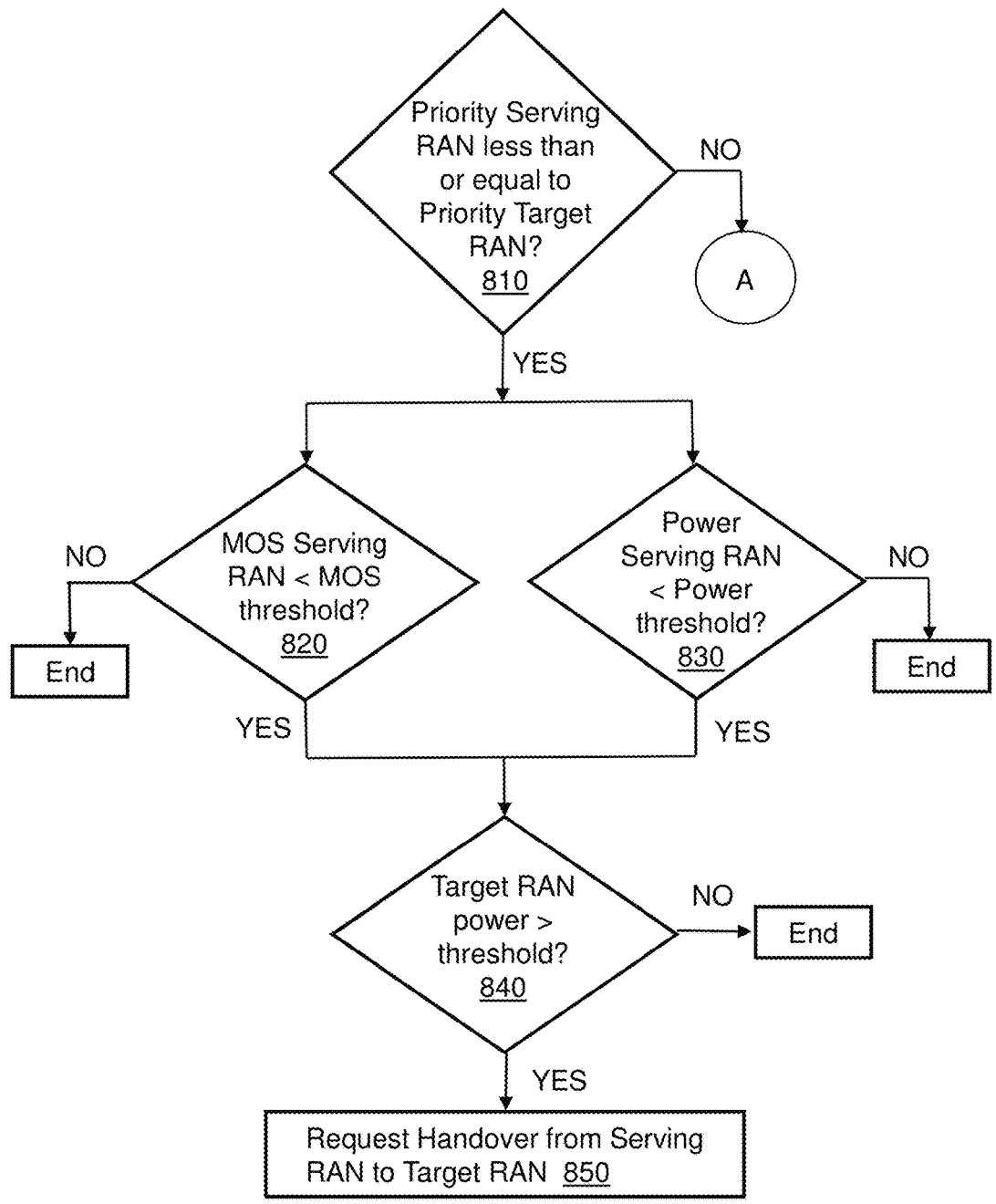
FIGS. 8A-8B depict illustrative embodiments of a method used in portions of the system described in FIG. 1.
Figure 8B:
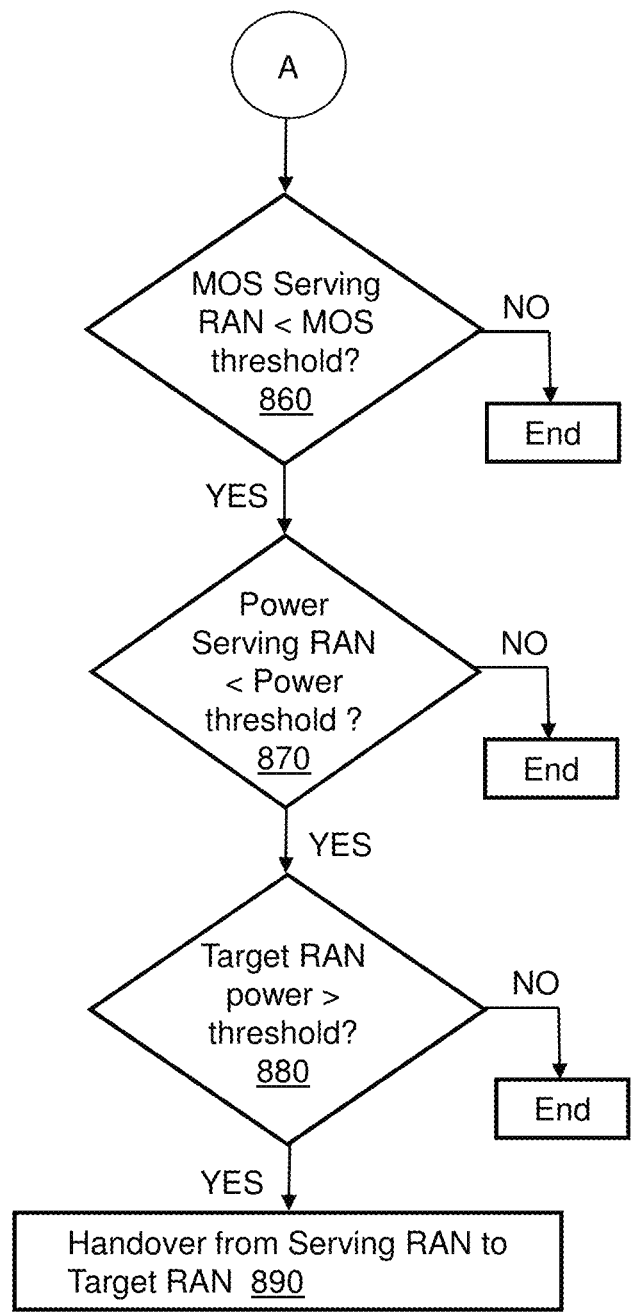

Referring to FIG. 7, one or more embodiments are illustrated. In one embodiment, the reselection policy can allow reselection from a lower priority RAN device to a higher priority RAN device under a reduced set of conditions. In this case, since the target RAN device has a higher priority than the serving RAN device, and the mobile device is idle (not engaged in call activity), the reselection policy can allow the mobile device 105 to reselect to the target RAN device anytime as long as the power/quality level of the target RAN device is above threshold (threshXHigh_IRAT) for greater than the reselection time ($t_{Reselection}$). For example, if the mobile device 105 is being served by a UMTS RAN device, while the target cell is an LTE RAN device, then the mobile device 105 can reselect to the LTE RAN device as long as the LTE RAN device signal is good and the mobile device 105 is in RRC_Idle. The reselection policy for the serving RAN device having lower priority can be defined as follows:

If the power of the target cell is greater than its power threshold
FOR
At least a threshold time,
THEN FIGS. 8A-8B depict illustrative embodiments of a method used in portions of the system described in FIG. 1. Referring particularly to FIG. 8A, a method 800 is shown for a handover policy for a mobile device. In one or more embodiments, the mobile device can be communicatively coupled to a communication network via a wireless, serving RAN device, while the mobile device can receive wireless signals from a target RAN device that can likewise couple the mobile device to the communication network. The mobile device can be operating in an active mode, such as an RRC-Connected. In this mode, the mobile device can engage in a call session via the communication network. During the call session, the mobile device can monitor network performance information, such as latency, packet loss, and traffic loading, and, in turn, can generate a predicted voice quality from the network performance information. The mobile device can also measure the signals emanating from the serving RAN device and the target RAN device to determine one or more signal power and/or signal quality measures. The mobile device can transmit a measurement report of the signals emanating from the serving RAN device and the target RAN device to determine one or more signal power and/or signal quality measures to the serving RAN device.

In step 810, the serving RAN device can compare the priorities of the serving RAN device and the target RAN device. The priorities of the RAN device devices can be assigned by the system according to factors, such as complexity/modernity of the cellular technology, whether the RAN device is a cellular RAN device or a wireless data hotspot, and/or whether the RAN device is a building or venue-specific device. If the serving RAN device determines that the serving RAN device is a higher priority than the target RAN device, in step 810, then the serving RAN device can determine whether the measure of vocal quality (e.g., MOS) for the serving RAN device exceeds a threshold, in step 820, or, alternatively, whether the signal power of the serving RAN device exceeds a threshold, in step 830. If the either the serving RAN device MOS or signal power exceeds the applicable threshold in step 820 or step 830, then the serving RAN device can determine, in step 840 whether the target RAN device signal power exceeds a threshold. If neither the MOS nor the signal power of serving RAN device exceed threshold, in steps 820 and 830, then the serving RAN device can end the handover policy method. If, in step 840, the serving RAN device determines that target RAN device signal power exceeds a threshold, and then the serving RAN device can request a handover of the mobile device from the serving RAN device to the target RAN device, else the serving RAN device can end the handover policy method.

If the serving RAN device determines that the serving RAN device is a higher priority than the target RAN device, in step 810, then the method continues at step 860, as shown in FIG. 8B. The serving RAN device can determine whether the measure of vocal quality (e.g., MOS) for the serving RAN device exceeds a threshold at step 860. If the measure of the vocal quality exceeds the threshold, then the serving RAN device can determine, at step 870, whether the signal power of the serving RAN device exceeds a threshold. If the signal power exceeds the applicable threshold in step 870, then the serving RAN device can determine, in step 880, whether the target RAN device signal power exceeds a threshold and proceed to step 890 where the serving RAN device can request a handover from the serving RAN device to the target RAN device. If any of the MOS does not exceed the threshold, the signal power of serving RAN device does not exceed the threshold, or the signal power of the target RAN device does not exceed the threshold, in steps 860, 870, and 880, then the serving RAN device can end the handover policy method.

Figure 9:
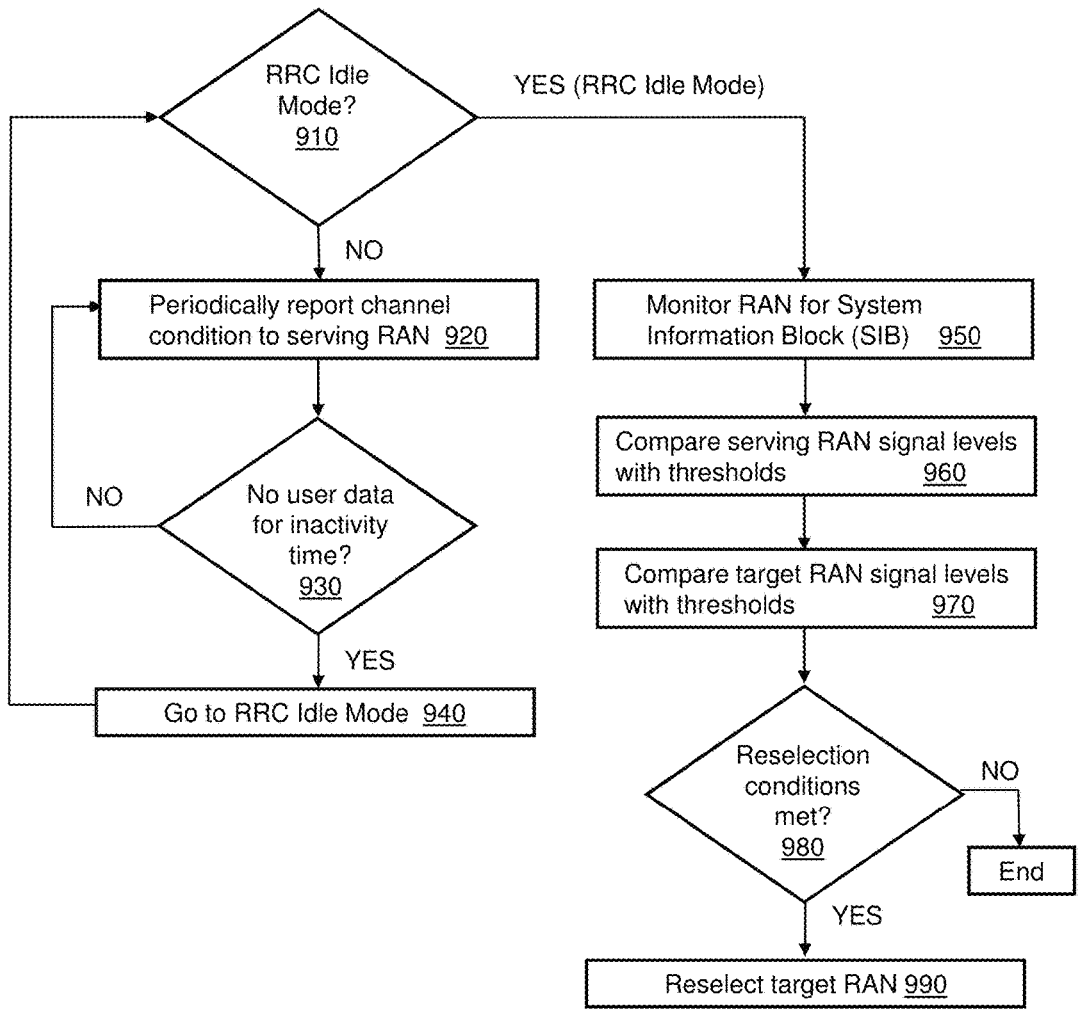
FIG. 9 depicts illustrative embodiments of a method used in portions of the system described in FIG. 1.

Referring particularly to FIG. 9, a method is shown for a reselection policy for a mobile device that is operating in an idle mode (e.g., RRC Idle). In one or more embodiments, the mobile device can again be communicatively coupled to a communication network via a wireless, serving RAN device, while the mobile device can receive wireless signals from a target RAN device that can likewise couple the mobile device to the communication network. However, the mobile device can be either in RRC Idle mode or, at a minimum, not actively engaged in a voice or data session, so that the measure of vocal quality (e.g., MOS) is not being measured.

In step 910, the mobile device can determine if the mobile device is in the RRC-Idle Mode. If the mobile device is not in the RRC-Idle Mode, then, in step 920, the mobile device can periodically report the channel condition to the serving RAN device. At step 930, the mobile device will determine if user activity (e.g., call sessions, data requests) has ended at the mobile device for an inactivity time period. For example, a period of inactivity longer than four seconds, or so, can be the threshold. Before the expiration of the inactivity timer, the mobile device will continue to report the channel condition at step 920. If the inactivity exceeds the threshold time, then the mobile device can enter the RRC-Idle Mode in step 940.

If the mobile device is in the RRC-Idle Mode at step 910, then mobile device monitor available RAN devices, such as the last serving RAN device and any other target RAN devices, for system information block (SIB) messages that can be sent from the RAN devices on a periodic basis in step 950. The mobile device can capture and compare signal levels from the serving RAN device with threshold levels in step 960, and, similarly, capture and compare signal levels from a target RAN device with threshold levels in step 970. In step 980, the mobile device can determine if reselection conditions have been met. For example, if the target RAN device has a higher priority than the serving RAN device, then the only reselection condition is that the RF signal from target RAN device exceeds a threshold level. Alternatively, if the serving RAN device has a higher priority, then the reselection conditions require that the serving RAN device RF signal be below threshold while the target RAN device is above threshold. If the reselection conditions are met in step 980, then the mobile device can initiate a reselection from the serving RAN device to the target RAN device.

Figure 10:
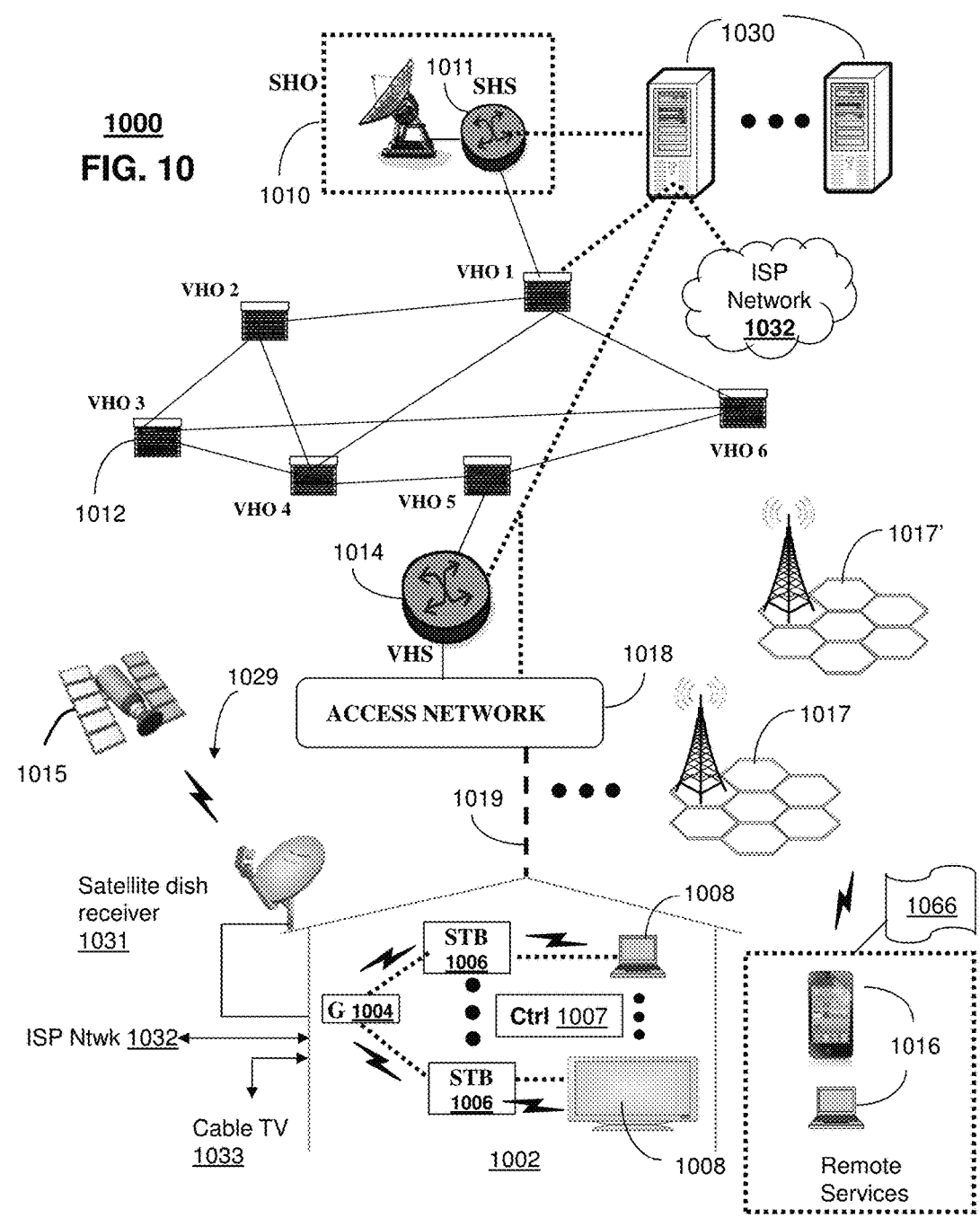
FIGS. 10-11 depict illustrative embodiments of communication systems that provide media and telephonic services to the mobile devices described in FIGS. 1-10.
Figure 11:
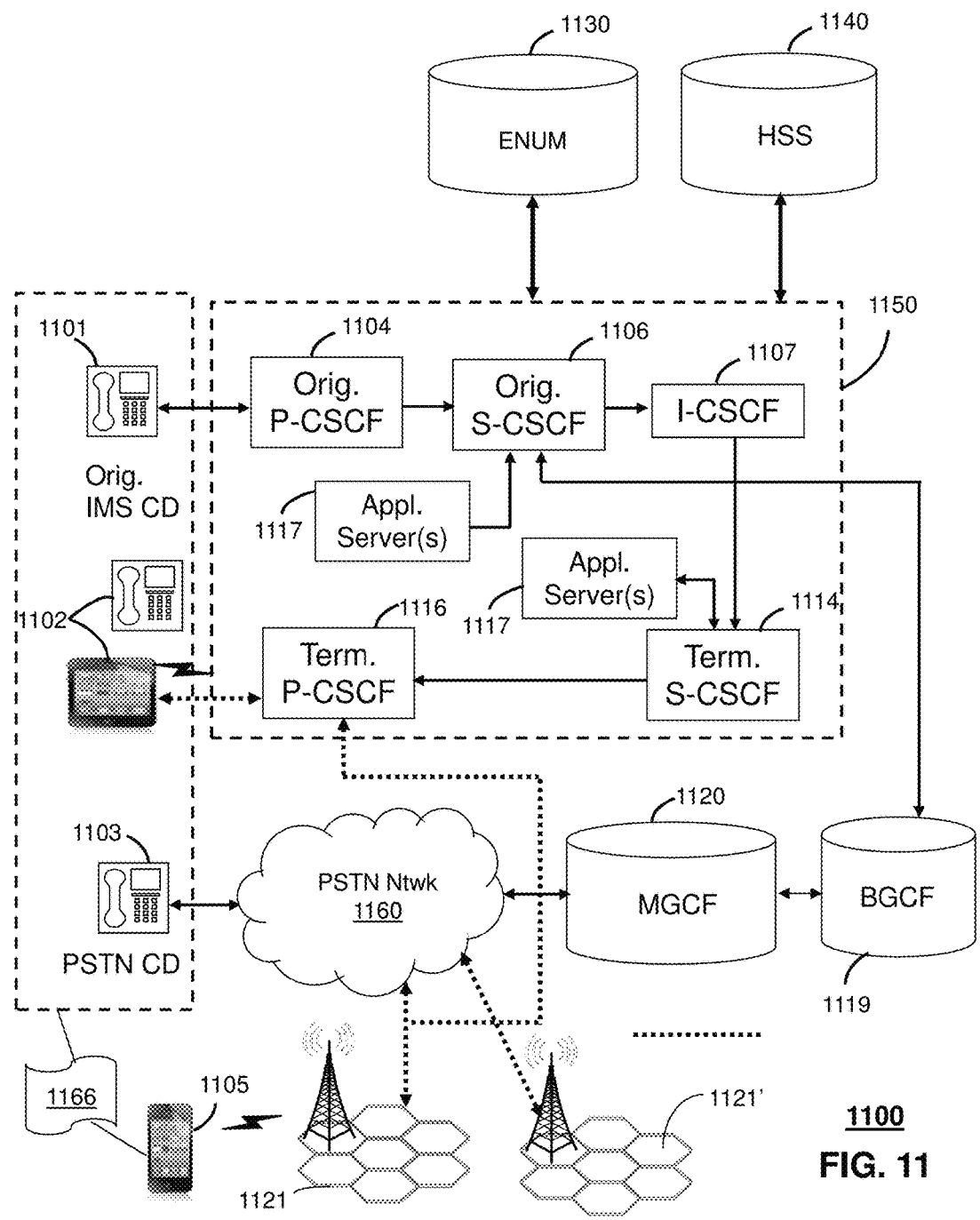

FIGS. 10-11 depict illustrative embodiments of communication systems that provide media and telephonic services to the mobile devices described in FIGS. 1-9. In particular, FIG. 10 depicts an illustrative embodiment of a first communication system 1000 for delivering media content. The communication system 1000 can represent an Internet Protocol Television (IPTV) media system. Communication system 1000 can be overlaid or operably coupled with system 100 of FIG. 1 as another representative embodiment of communication system 1000. For instance, one or more devices illustrated in the communication system 1000 of FIG. 10 can perform steps for capturing network performance information at a mobile device 1016. The network performance information can include characteristics that impact vocal quality for voice over internet protocol (VoIP) communications at the mobile device 1016. For example, the mobile device 1016 can track latency, packet loss, jitter, and traffic loading associated with a VoIP call session. The mobile device 1016 can apply a voice quality model to this network performance information. For example, the mobile device 1016 can include a model for calculating a measure of voice quality, such as a predictive mean opinion score (MOS), for estimating a perceived customer quality of a VoIP call session from the available network performance information. The mobile device 1016 can measure the power and/or quality of a first signal emanating from a serving radio access network (RAN) device 1017 that is currently providing a wireless communication coupling between the mobile device 1016 and a communication network 1000. The mobile device 1016 can also measure power/quality of a second signal emanating from a second, target RAN device 1017' that could be substituted for the serving RAN device 1017. The mobile device 1016 can apply a handover policy to the measured power/quality of the sensing and target RAN devices 1017 and 1017' and to the broadcasted voice quality to identify if the combination of signal strength/power, the voice quality, and the relative priorities of the serving and target RAN devices are consistent with a handover trigger condition for the mobile device 1016. That is, the combination of signal strength, RAN device priority, and voice quality make it desirable for the mobile device 1016 to be handed over from the serving RAN device 1017 to the target RAN device 1017'. The mobile device 1016 can send a report to the serving RAN device 1017 indicating the handover trigger condition, where the serving RAN device 1017 and the target RAN device 1017' can coordinate the handover.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content, and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (Wi-Fi), Bluetooth®, Zigbee®, or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services. System 1000 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for all or a portion of the mobile devices 406 can be provisioned with software functions 466 to perform handover and deselection functions as described for the mobile devices 105 of FIG. 1 in accordance with methods 700-900 of FIGS. 7-9.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 11 depicts an illustrative embodiment of a communication system 1100 employing an IP Multimedia Subsystem (IMS) network architecture to facilitate the combined services of circuit-switched and packet-switched systems. Communication system 1100 can be overlaid or operably coupled with system 100 of FIG. 1 as another representative embodiment of communication system 1100. For instance, one or more devices illustrated in the communication system 1100 of FIG. 11 can perform steps for capturing network performance information at a mobile device 1105. The network performance information can include characteristics that impact vocal quality for voice over internet protocol (VoIP) communications at the mobile device 1105. For example, the mobile device 1105 can track latency, packet loss, jitter, and traffic loading associated with a VoIP call session. The mobile device 1105 can apply a voice quality model to this network performance information. For example, the mobile device 1105 can include a model for calculating a measure of voice quality, such as a predictive mean opinion score (MOS), for estimating a perceived customer quality of a VoIP call session from the available network performance information. The mobile device 1105 can measure the power and/or quality of a first signal emanating from a serving radio access network (RAN) device 1121 that is currently providing a wireless communication coupling between the mobile device 1105 and a communication network 1100. The mobile device 1105 can also measure power/quality of a second signal emanating from a second, target RAN device 1121' that could be substituted for the serving RAN device 1121. The mobile device 1105 can apply a handover policy to the measured power/quality of the sensing and target RAN devices 1121 and 1121' and to the measure of voice quality to identify if the combination of signal strength/power, the voice quality, and the relative priorities of the serving and target RAN devices are consistent with a handover trigger condition for the mobile device 1105. That is, the combination of signal strength, RAN device priority, and voice quality make it desirable for the mobile device 1105 to be handed over from the serving RAN device 1121 to the target RAN device 1121'. The mobile device 1105 can send a report to the serving RAN device 1121 indicating the handover trigger condition, where the serving RAN device 1121 and the target RAN device 1121' can coordinate the handover.

Communication system 1100 can comprise a Home Subscriber Server (HSS) 1140, a tElephone NUmber Mapping (ENUM) server 1130, and other network elements of an IMS network 1150. The IMS network 1150 can establish communications between IMS-compliant communication devices (CDs) 1101, 1102, Public Switched Telephone Network (PSTN) CDs 1103, 1105, and combinations thereof by way of a Media Gateway Control Function (MGCF) 1120 coupled to a PSTN network 1160. The MGCF 1120 need not be used when a communication session involves IMS CD to IMS CD communications. A communication session involving at least one PSTN CD may utilize the MGCF 1120.

IMS CDs 1101, 1102 can register with the IMS network 1150 by contacting a Proxy Call Session Control Function (P-CSCF) which communicates with an interrogating CSCF (I-CSCF), which in turn, communicates with a Serving CSCF (S-CSCF) to register the CDs with the HSS 1140. To initiate a communication session between CDs, an originating IMS CD 1101 can submit a Session Initiation Protocol (SIP INVITE) message to an originating P-CSCF 1104 which communicates with a corresponding originating S-CSCF 506. The originating S-CSCF 1106 can submit the SIP INVITE message to one or more application servers (ASs) 1117 that can provide a variety of services to IMS subscribers.

For example, the application servers 1117 can be used to perform originating call feature treatment functions on the calling party number received by the originating S-CSCF 1106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1106 can submit queries to the ENUM system 1130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1107 to submit a query to the HSS 1140 to identify a terminating S-CSCF 1114 associated with a terminating IMS CD such as reference 1102. Once identified, the I-CSCF 1107 can submit the SIP INVITE message to the terminating S-CSCF 1114. The terminating S-CSCF 1114 can then identify a terminating P-CSCF 1116 associated with the terminating CD 1102. The P-CSCF 1116 may then signal the CD 1102 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 11 may be interchangeable. It is further noted that communication system 1100 can be adapted to support video conferencing. In addition, communication system 1100 can be adapted to provide the IMS CDs 1101, 1102 with the multimedia and Internet services of communication system 1000 of FIG. 10.

If the terminating communication device is instead a PSTN CD such as CD 1103 or CD 1105 (in instances where the cellular phone only supports circuit-switched voice communications), the ENUM system 1130 can respond with an unsuccessful address resolution which can cause the originating S-CSCF 1106 to forward the call to the MGCF 1120 via a Breakout Gateway Control Function (BGCF) 1119. The MGCF 1120 can then initiate the call to the terminating PSTN CD over the PSTN network 1160 to enable the calling and called parties to engage in voice and/or data communications.

It is further appreciated that the CDs of FIG. 11 can operate as wireline or wireless devices. For example, the CDs of FIG. 11 can be communicatively coupled to a cellular base station 1121, a femtocell, a Wi-Fi router, a Digital Enhanced Cordless Telecommunications (DECT) base unit, or another suitable wireless access unit to establish communications with the IMS network 1150 of FIG. 11. The cellular access base station 1121 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 11.

Cellular phones supporting LTE can support packet-switched voice and packet-switched data communications and thus may operate as IMS-compliant mobile devices. In this embodiment, the cellular base station 1121 may communicate directly with the IMS network 1150 as shown by the arrow connecting the cellular base station 1121 and the P-CSCF 1116.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

CDs 1101, 1102, 1103 and 1105, which can be adapted with software to perform function 1166 to perform functions described for mobile devices 105 of FIG. 1 in accordance with methods 700-900 of FIGS. 7-9.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 12:
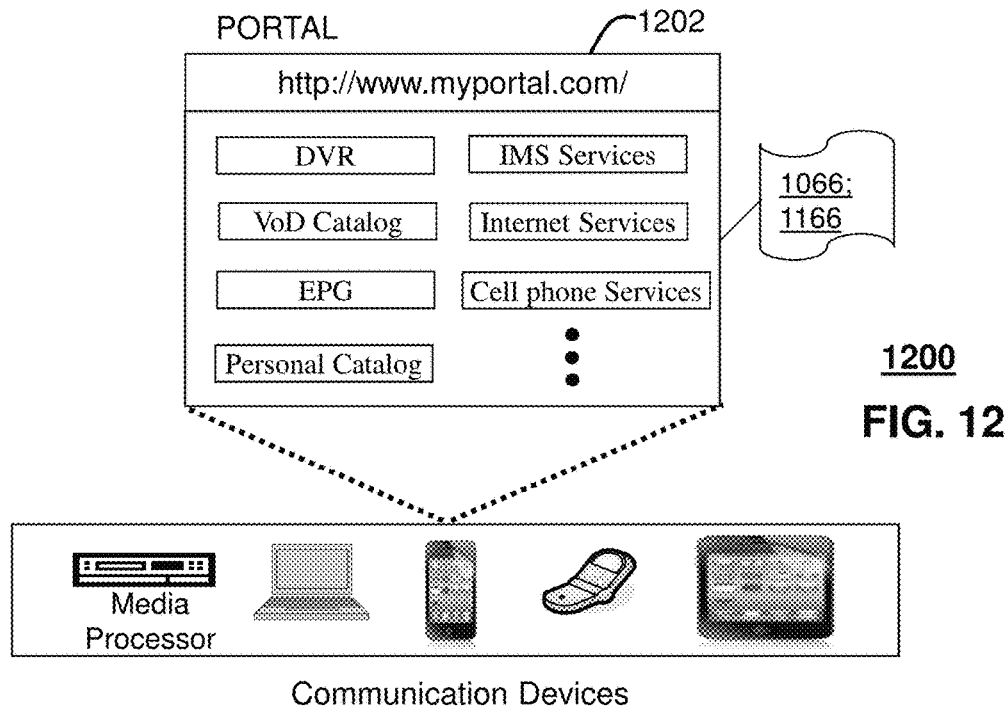
FIG. 12 depicts an illustrative embodiment of a web portal for interacting with the communication systems of FIGS. 1 and 10-11.

FIG. 12 depicts an illustrative embodiment of a web portal 1202 of a communication system 1200. Communication system 1200 can be overlaid or operably coupled with system 100 of FIG. 1, communication system 1000, and/or communication system 1100 as another representative embodiment of system 100 of FIG. 1, communication system 1000, and/or communication system 1100. The web portal 1102 can be used for managing services of system 100 of FIG. 1 and communication systems 1000-1100. A web page of the web portal 1202 can be accessed by a Uniform Resource Locator (URL) with an Internet browser using an Internet-capable mobile device such as those described in FIG. 1 and FIGS. 10-11. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1006. The web portal 1202 can also be used for provisioning IMS services described earlier, provisioning Internet services, provisioning cellular phone services, and so on.

The web portal 1202 can further be utilized to manage and provision software applications 1066 and 1166 to adapt these applications as may be desired by subscribers and/or service providers of system 100 of FIG. 1 and communication systems 1000-1100. For instance, [users of the mobile devices 105 can log into their on-line accounts and provision mobile devices 105 with user profiles, provide contact information to a server to enable it to communication with devices described in FIGS. 1 and 10-11, and so on. Service providers can log onto an administrator account to provision, monitor and/or maintain the system 100 of FIG. 1.

Figure 13:
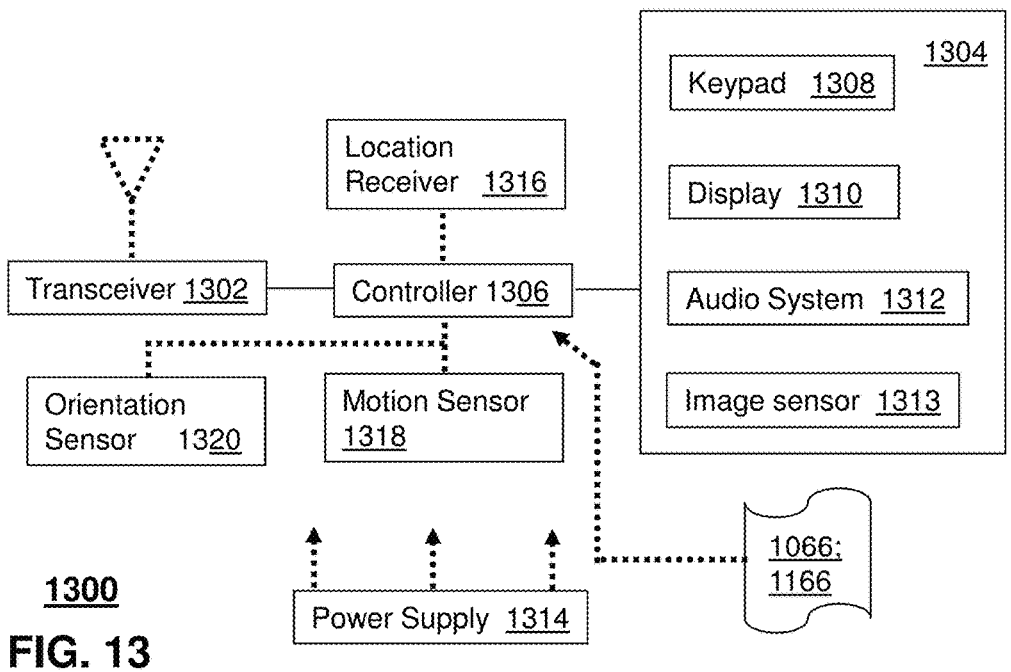
FIG. 13 depicts an illustrative embodiment of a communication device.

FIG. 13 depicts an illustrative embodiment of a communication device 1300. Communication device 1300 can serve in whole or in part as an illustrative embodiment of the devices depicted in FIGS. 1 and 2, and FIGS. 10-11 and can be configured to perform portions of methods 700-900 of FIGS. 7-9.

Communication device 1300 can comprise a wireline and/or wireless transceiver 1302 (herein transceiver 1302), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.), and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth®. The keypad 1308 can represent a numeric keypad commonly used by phones, and/or a QWERTY keypad with alphanumeric keys. The UI 1304 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface with graphical user interface (GUI) elements that can be selected by a user with a touch of a finger. The touch screen display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 1313 such as a charged coupled device (CCD) camera for capturing still or moving images.

The power supply 1314 can utilize common power management technologies such as replaceable and rechargeable batteries, supply regulation technologies, and/or charging system technologies for supplying energy to the components of the communication device 1300 to facilitate long-range or short-range portable applications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west, and east, as well as combined orientations in degrees, minutes, or other suitable orientation metrics).

The communication device 1300 can use the transceiver 1302 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1300.

Other components not shown in FIG. 13 can be used in one or more embodiments of the subject disclosure. For instance, the communication device 1300 can include a reset button (not shown). The reset button can be used to reset the controller 1306 of the communication device 1300. In yet another embodiment, the communication device 1300 can also include a factory default setting button positioned, for example, below a small hole in a housing assembly of the communication device 1300 to force the communication device 1300 to re-establish factory settings. In this embodiment, a user can use a protruding object such as a pen or paper clip tip to reach into the hole and depress the default setting button. The communication device 1300 can also include a slot for adding or removing an identity module such as a Subscriber Identity Module (SIM) card. SIM cards can be used for identifying subscriber services, executing programs, storing subscriber data, and so forth.

The communication device 1300 as described herein can operate with more or less of the circuit components shown in FIG. 13. These variant embodiments can be used in one or more embodiments of the subject disclosure.

The communication device 1300 can be adapted to perform the functions of devices of FIGS. 1 and/or 2, the media processor 1006, the media devices 1008, or the mobile devices 1016 of FIG. 10, as well as the IMS CDs 1101-1102 and PSTN CDs 1103-1105 of FIG. 11. It will be appreciated that the communication device 1300 can also represent other devices that can operate in systems of FIGS. 1 and/or 2, communication systems 1000-1100 of FIGS. 10-11 such as a gaming console and a media player. In addition, the controller 1306 can be adapted in various embodiments to perform the functions 1066 and 1166, respectively.

Upon reviewing the aforementioned embodiments, it would be evident to an artisan with ordinary skill in the art that said embodiments can be modified, reduced, or enhanced without departing from the scope of the claims described below. For example, a RAN device could receive voice quality scores (e.g., MOS scores) from many mobile devices operating in the area of the RAN device. The RAN device could average the voice quality scores for these mobile devices to generate a composite voice quality score for mobile devices under service from the RAN device. In one embodiment, the RAN device can transmit its composite voice quality score to neighboring RAN devices to indicate its viability as a handover/reselection destination. In one embodiment, the RAN device can use a weighting algorithm with the reported voice quality scores. For example, the RAN device can only include the scores for mobile devices at the outer most area of the RAN device's service area. In this way, the RAN device can provide scores most relevant to handover situations, where mobile devices are operating at the boundaries of competing RAN devices. In another embodiment, the RAN devices can weight voice quality scores based on their location or based on the reported RF signal strengths that accompany the voice quality scores. Other embodiments can be used in the subject disclosure. It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
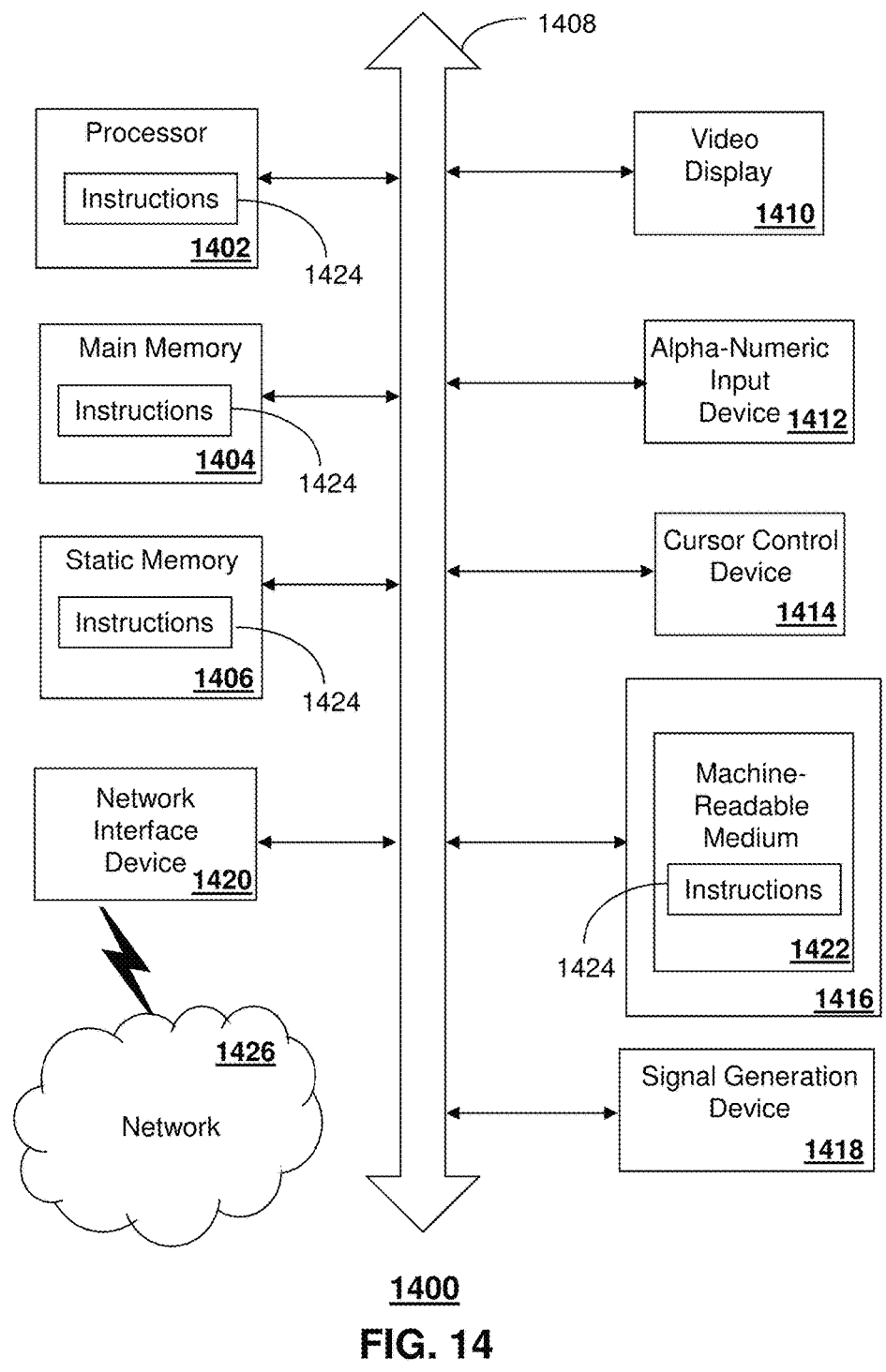
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example the mobile device 105 and the RAN devices 110-125, and other devices of FIGS. 1, 2, 10, and 11. In some embodiments, the machine may be connected (e.g., using a network 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 800 may include an input device 1412 (e.g., a keyboard), a cursor control device 814 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments.

Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

providing, by a processing system comprising a processor, a reporting event trigger to a first wireless radio access network for a call session, wherein the first wireless radio access network provides a first wireless communicative coupling of the processing system and a communication network during the call session, and wherein the reporting event trigger is generated responsive to a change of a quality of the call session;

selecting, by the processing system, a handover policy for the first wireless radio access network and a second wireless radio access network based on a first priority for the first wireless radio access network and a second priority for the second wireless radio access network;

measuring, by the processing system, a first strength of a first signal that is received from the first wireless radio access network and a second strength of a second signal that is received from the second wireless radio access network;

comparing, by the processing system, the first strength of the first signal to a first threshold to determine a first offset of the first signal to the first threshold;

comparing, by the processing system, the second strength of the second signal to a second threshold to determine a second offset of the second signal to the second threshold;

comparing, by the processing system, a measure of voice quality for the call session according to a voice quality model to a third threshold to determine a third offset of the measure of voice quality to the third threshold;

detecting an event trigger condition for the reporting event trigger according to the first offset, the second offset, and the third offset;

determining, by the processing system, that a handover condition of the handover policy has been met by the first strength and the second strength; and performing, by the processing system, a handover from the first wireless radio access network to the second wireless radio access network responsive to the determining that the handover condition has been met.

2. The method of claim 1, wherein the first wireless radio access network generates a ranking of the first priority and the second priority, wherein the first wireless radio access network selects the handover policy from a plurality of handover policies according to the ranking, and wherein the first wireless radio access network transmits a handover request to the second wireless radio access network responsive to the determining.

3. The method of claim 1, further comprising identifying, by the processing system, an operating mode of the processing system, wherein the operating mode comprises one of a connected mode or an idle mode, and wherein the event trigger condition is detected according to the operating mode that is identified for the processing system.

4. The method of claim 3, further comprising:

initiating, by the processing system, a first time interval responsive to detecting of the event trigger condition; and re-detecting, by the processing system, the event trigger condition according to the measure of voice quality for the call session according to the voice quality model, the first strength of the first signal, and the second strength of the second signal responsive to the initiating of the first time interval to determine that the event trigger condition persists for a first interval; and detecting, by the processing system, an expiration of the first time interval, wherein the performing of the handover is conditioned on the expiration of the first time interval and determining that the event trigger condition persists for the first interval.

5. The method of claim 1, further comprising:

initiating, by the processing system, a first time interval responsive to detecting the event trigger condition; and re-detecting, by the processing system, the event trigger condition according to the measure of voice quality, the first strength of the first signal, and the second strength of the second signal responsive to the initiating of the first time interval to determine that the event trigger condition persists for a first interval; and detecting, by the processing system, an expiration of the first time interval, wherein the performing of the handover is conditioned on the expiration of the first time interval and determining that the event trigger condition persists for the first interval.

6. The method of claim 5, further comprising:
initiating, by the processing system, a second time interval responsive to the detecting of the expiration of the first time interval and the determining that the event trigger condition persists for the first interval; and
re-detecting, by the processing system, the event trigger condition according to the measure of voice quality, the first strength of the first signal, and the second strength of the second signal responsive to the initiating of the second time interval to determine that the event trigger condition persists for a second interval; and
detecting, by the processing system, an expiration of the second time interval to determine that the event trigger condition persists for the second interval; and
re-performing, by the processing system, the handover responsive to the expiration of the second time interval.

7. The method of claim 1, wherein the voice quality model correlates network performance information to a user perception of voice quality at the processing system.

8. The method of claim 7, wherein the network performance information comprises one of latency, packet loss, jitter, traffic loading, or any combination thereof, and wherein the voice quality model correlates the network performance information to the user perception of voice quality at the processing system.

9. A device, comprising:
a processing system including a processor; and
a memory that stores executable instructions that, when executed by the processing system, facilitate performance of operations, comprising:
performing a call session between a communication network and a mobile communications device;
selecting a handover policy for the call session from the device to a target wireless radio access network based on a first priority for the device and a second priority for the target wireless radio access network;
measuring a first strength of a first signal that is received from the communication network and a second strength of a second signal that is received by the target wireless radio access network from the communication network;
determining that a handover condition of the handover policy has been met by the first strength and the second strength;
generating a measurement report comprising a measure of voice quality, the first strength of the first signal, and the second strength of the second signal, wherein the generating the measurement report enables the device to determine a first handover policy selected from a plurality of handover policies according to a ranking of the first priority and the second priority, and wherein the device applies the first handover policy to the measure of voice quality, the first strength of the first signal, and the second strength of the second signal of the measurement report based upon the first priority that is associated with the device and the second priority that is associated with the target wireless radio access network; and
instructing the mobile communications device to perform a handover from the device to the target wireless radio access network according to the measurement report and responsive to the determining that the handover condition has been met.

10. The device of claim 9, wherein the operations further comprise identifying an operating mode of the processing system, wherein the operating mode comprises one of a connected mode or an idle mode, and wherein an event trigger condition for the measurement reporting is detected according to the operating mode that is identified for the processing system.

11. The device of claim 9, wherein the operations further comprise:
comparing the first strength of the first signal to a first threshold to determine a first offset of the first signal to the first threshold; and
comparing the second strength of the second signal to a second threshold to determine a second offset of the second signal to the second threshold.

12. The device of claim 11, wherein the operations further comprise comparing the measure of voice quality to a third threshold to determine a third offset of the measure of voice quality to the third threshold, wherein an event trigger condition for the measurement reporting is detected according to the first offset, the second offset, and the third offset.

13. The device of claim 9, wherein the measure of voice quality correlates network performance information to a user perception of voice quality at the processing system, and wherein the network performance information comprises one of latency, packet loss, jitter, traffic loading, or any combination thereof.

14. The device of claim 9, wherein the measurement report comprises:
a first report responsive to the second strength of the second signal of the target wireless radio access network being better than the first strength of the first signal of the device by an offset and the measure of voice quality for the device being worse than a first threshold; and
a second report responsive to one of the first strength of the first signal of the device being worse than the first threshold and the measure of voice quality for the device being worse than a second threshold, in addition to the second strength of the second signal of the target wireless radio access network being better than a third threshold.

15. A non-transitory, machine-readable storage medium, comprising executable instructions that, when executed by a processing system including a processor, facilitate performance of operations, comprising:
providing a reporting event trigger to a serving wireless radio access network for a call session, wherein the serving wireless radio access network provides a first wireless communicative coupling of the processing system and a communication network during the call session, and wherein the reporting event trigger is generated responsive to a change of a quality of the call session;
selecting a handover policy for the serving wireless radio access network and a target wireless radio access network from among a plurality of wireless radio access networks based on a first priority for the serving wireless radio access network and a second priority for the target wireless radio access network;
measuring a first strength of a first signal that is received from the serving wireless radio access network and a second strength of a second signal that is received from the target wireless radio access network;
determining that a handover condition of the handover policy has been met by the first strength and the second strength; and
performing a handover from the serving wireless radio access network to the target wireless radio access network responsive to the determining that the handover condition has been met, wherein the serving wireless radio access network generates a ranking of the first priority and the second priority, wherein the serving wireless radio access network selects the handover policy from a plurality of handover policies according to the ranking, and wherein the serving wireless radio access network transmits a handover request to the target wireless radio access network responsive to the determining.

16. The non-transitory, machine-readable storage medium of claim 15, wherein the operations further comprise identifying, by the processing system, an operating mode of the processing system, wherein the operating mode comprises one of a connected mode or an idle mode, and wherein an event trigger condition is detected according to the operating mode that is identified for the processing system.

17. The non-transitory, machine-readable storage medium of claim 16, wherein the operations further comprise:
  comparing, by the processing system, the first strength of the first signal to a first threshold to determine a first offset of the first signal to the first threshold;
  comparing, by the processing system, the second strength of the second signal to a second threshold to determine a second offset of the second signal to the second threshold; and
  comparing, by the processing system, a measure of voice quality for the call session according to a voice quality model to a third threshold to determine a third offset of the measure of voice quality to the third threshold, wherein the event trigger condition is detected according to the first offset, the second offset, and the third offset.

18. The non-transitory, machine-readable storage medium of claim 17, wherein the operations further comprise:
  initiating, by the processing system, a first time interval responsive to detecting of the event trigger condition; and
  re-detecting, by the processing system, the event trigger condition according to the measure of voice quality, the first strength of the first signal, and the second strength of the second signal responsive to the initiating of the first time interval to determine that the event trigger condition persists for a first interval; and
  detecting, by the processing system, an expiration of the first time interval, wherein the performing of the handover is conditioned on the expiration of the first time interval and determining that the event trigger condition persists for the first interval.

19. The non-transitory, machine-readable storage medium of claim 17, wherein the voice quality model correlates network performance information to a user perception of voice quality at the processing system.

20. The non-transitory, machine-readable storage medium of claim 19, wherein the network performance information comprises one of latency, packet loss, jitter, traffic loading, or any combination thereof, and wherein the voice quality model correlates the network performance information to the user perception of voice quality at the processing system.

* * * * *